US012756287B2

(12) United States Patent
Riddell

(10) Patent No.: US 12,756,287 B2
(45) Date of Patent: Oct. 6, 2026

(54) PIVOTING CENTRAL MAGNET ENERGY HARVESTING GENERATOR

(71) Applicant: WePower Technologies LLC, Sagaponack, NY (US)

(72) Inventor: Michael Joseph Riddell, Glastonbury, CT (US)

(73) Assignee: WePower Technologies LLC, Sagaponack, NY (US)

( * ) Notice: Subject to any disclaimer, the term of this patent is extended or adjusted under 35 U.S.C. 154(b) by 332 days.

(21) Appl. No.: 18/403,597

(22) Filed: Jan. 3, 2024

(65) Prior Publication Data

US 2024/0223056 A1 Jul. 4, 2024

Related U.S. Application Data

(60) Provisional application No. 63/437,067, filed on Jan. 4, 2023.

(51) Int. Cl.
*H02K 35/02* (2006.01)

(52) U.S. Cl.
CPC ......... *H02K 35/02* (2013.01); *H02K 2203/12* (2013.01)

(58) Field of Classification Search
CPC .. H02K 7/1869; H02K 7/1876; H02K 7/1884; H02K 35/00; H02K 35/02
See application file for complete search history.

(56) References Cited

U.S. PATENT DOCUMENTS 2,595,870 A * 5/1952 Morganson ............ H02K 25/00 310/40 MM
2008/0048506 A1* 2/2008 Deak ...................... H02K 35/02 310/12.25
2008/0074083 A1* 3/2008 Yarger ...................... H02J 7/32 320/137
2008/0164702 A1* 7/2008 Brown .................. H02K 35/02 310/75 A
2011/0254285 A1* 10/2011 Hanchett, Jr. ........ H02K 7/1853 290/1 R
2015/0229242 A1 8/2015 Chimamkpam
2016/0134173 A1* 5/2016 Deak, Sr. ............. H02K 7/1876 290/1 A

OTHER PUBLICATIONS

International Search Report and Written Opinion, mailed Apr. 19, 2024, International Patent Application No. PCT/US2024/10161, filed Jan. 3, 2024.

* cited by examiner

*Primary Examiner* — Eric Johnson

(74) *Attorney, Agent, or Firm* — Mintz Levin Cohn Ferris Glovsky and Poneo PC

(57) ABSTRACT

Disclosed is a generator magnet configuration that may be used in connection with energy harvesting technologies. In some embodiments, an electrical generator may include a generator magnet positioned within a coil wire such that the generator magnet's magnetic field is normal to the coil. The generator magnet may be actuated from a first, substantially vertical orientation to a second, substantially horizontal orientation. The generator magnet may rotate from the substantially horizontal orientation to the substantially vertical orientation when the actuation is released, such that the magnetic field of the generator magnet induces a voltage across the coil. In some embodiments, the generator magnet may form a stacked configuration on top of a stationary magnet.

18 Claims, 31 Drawing Sheets

600

PIVOTING CENTRAL MAGNET ENERGY HARVESTING GENERATOR

CROSS REFERENCE TO RELATED APPLICATIONS

The application claims priority under 35 U.S.C. § 119(a) to U.S. Provisional Application No. 63/437,067, filed on Jan. 4, 2023 and entitled "PIVOTING CENTRAL MAGNET ENERGY HARVESTING GENERATOR," the disclosure of which is incorporated by reference herein in its entirety.

TECHNICAL FIELD

The present disclosure is generally directed towards mechanisms that may be used in energy harvesting.

BACKGROUND

Conventional mechanically-based energy harvesting generators often require complex configurations and numerous components. For example, some conventional energy harvesting generators may require a plurality of magnets, bearings for reducing friction, engagement drive mechanisms for various actuators incorporated into the generators, springs, and the like. Additionally, the increased assembly costs and material costs that result from the use of an increased number of components in the device can result in a corresponding increase in the total cost to manufacture the device. Accordingly, there remains a need for a streamlined design for mechanically-based energy harvesting generators that utilizes fewer components while at the same time provides requisite power output.

SUMMARY

Various embodiments of energy harvesting mechanisms are provided.

Embodiments of the present disclosure are directed towards mechanically-based energy harvesting generators. In some embodiments the energy harvesting generator may include a pivoting central magnet. In some embodiments, the pivoting central magnet may require reduced part counts, which in turn reduces manufacturing costs due to a decrease in assembly and material costs. In some embodiments, the reduced part count contributes to greater reliability of the energy harvesting generator, due in part to having fewer parts that may contribute towards design failure.

Embodiments of the present disclosure may include an energy harvesting generator including a plurality of turns of wire forming a coil, a generator magnet positioned in an interior region of the coil, and an actuator movable relative to the generator magnet and configured to impart energy into the generator magnet. The actuator may be configured such that the actuator moves the generator magnet from a first position relative to a plane along which the coil is disposed to a second position relative to the plane, such that the generator magnet pivots. Further, the generator magnet may return to the first position from the second position upon release of the actuator. Additionally, movement of the generator magnet from the second position to the first position may induce a voltage across the coil.

Optionally, an energy harvesting generator may include a stationary magnet positioned below the generator magnet, and the stationary magnet may apply a restoring force to the generator magnet to return the generator magnet to the first position from the second position upon release of the actuator. In some embodiments at least a part of the voltage induced in the coil may be due to the movement of the generator magnet and the magnetic field of the stationary magnet. In some embodiments, at least one of a flexure, hinge, or isolation pad may be positioned at an interface of the generator magnet and the stationary magnet.

In some embodiments, the actuator of the energy harvesting generator may also include a first drive lobe configured to move the generator magnet. The actuator may also include a second drive lobe configured to move the generator magnet. The actuator may also include at least one retaining wall positioned on a terminal end of the actuator. The at least one retaining wall may be configured to position at least one of the first drive lobe or the second drive lobe.

Optionally, the energy harvesting generator may include a casing having a bobbin configured to hold the coil. A casing may also have least one compartment configured to hold the generator magnet.

Optionally, the energy harvesting generator may include a ferrous steel return block positioned below the generator magnet, where the ferrous steel return block is coupled to the generator magnet to return the generator magnet to the first position from the second position upon release of the actuator via magnetic force.

Optionally, the energy harvesting generator may include a spring flexure coupled to and extending from the generator magnet, wherein the spring flexure guides the generator magnet to return to the first position from the second position upon release of the actuator via mechanical spring force.

In some embodiments, a method for energy generation may include the steps of positioning a generator magnet in a coil formed from a plurality of turns of wire, actuating the generator magnet from a first position relative to a plane along which the coil is disposed to a second position in which the poles of the generator magnet are in a second position relative to the plane, and inducing a voltage in the coil by releasing the actuation of the generator magnet such that the generator magnet rotates or pivots from the second position to the first position. Optionally, a method for energy generation may also include the step of applying, by a stationary magnet positioned below the generator magnet, a restoring force to the generator magnet to return the generator magnet to the first position from the second position.

In some embodiments, an energy harvesting generator may include a plurality of turns of wire forming a coil, a generator magnet positioned within the coil, a stationary magnet positioned below the generator magnet, and an actuator movable relative to the generator magnet. The actuator may be configured such that the actuator moves the generator magnet from a first position relative to a plane along which the coil is disposed to a second position in which the poles of the generator magnet are in a second position relative to the plane, and the generator magnet may return to the first position from the second position upon release of the actuator at least due in part to a magnetic restoring force applied to the generator magnet by the stationary magnet. Additionally, movement of the generator magnet from the second position to the first position induces a voltage in the coil. Optionally, the energy harvesting generator may include a least one of a flexure, hinge, or isolation pad positioned at an interface of the generator magnet and the stationary magnet. The actuator may also include a first drive lobe configured to move the generator magnet. The actuator may also include a second drive lobe configured to move the generator magnet. Optionally, the actuator may include at least one retaining wall on a terminal end of the actuator that is configured to position at least one of the first drive lobe or the second drive lobe. Optionally, the energy harvesting generator may include a casing having a bobbin configured to hold the coil. Optionally, the energy harvesting generator may include a casing having at least one compartment configured to hold the generator magnet. Optionally, the energy harvesting generator may include a casing having at least one compartment configured to hold the stationary magnet.

BRIEF DESCRIPTION OF THE DRAWINGS

The embodiments described above will more fully understood from the following detailed description taken in conjunction with the accompanying drawings. The drawings are not intended to be drawn to scale. For the purposes of clarity, not every component may be labeled in every drawing. In the drawings.

DETAILED DESCRIPTION

Figure 1A:
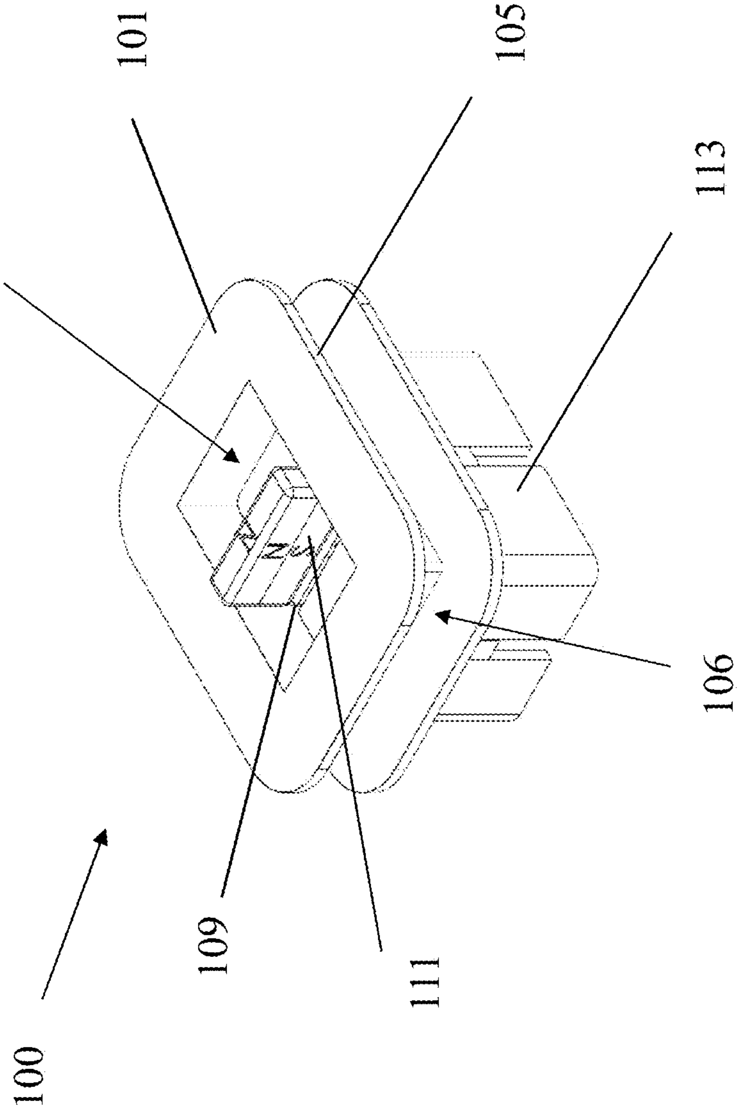
FIG. 1A illustrates a first perspective view of an energy harvesting generator in accordance with some embodiments of the present disclosure.

Certain exemplary embodiments will now be described to provide an overall understanding of the principles of the structure, function, manufacture, and use of the apparatus, devices, and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, device, and methods, such dimensions are not intended to limit the types of shapes that may be used in conjunction with such systems, device, and methods. A person skilled in the art will recognize that an equivalent to such linear and circular dimensions may easily be determined for any geometric shape. Sizes and shapes of the systems and devices, and the components thereof, may depend at least on the dimensions of the subject in which the systems and devices will be used, and the methods with which the systems and devices will be used.

Various energy harvesting generator devices and systems are provided that may include a plurality of turns of wire forming a coil and a magnet disposed at least partially in the coil. The magnet may be disposed approximal to the coil and configured for magnetic flux induction in the coil. The coil may optionally be disposed upon a bobbin that is configured to retain the coil, and the magnet may similarly be retained in the bobbin. The energy harvesting generator can also include an actuator that is configured to cause the magnet to move relative to the coil and thereby induce a voltage in the coil in accordance with Faraday's Law of Electromagnetic Induction. More specifically, in some embodiments, the time-rate change of magnetic flux generated by the magnet may induce a voltage in a stationary coil of insulated wire. And, in some embodiments, the magnet may be moved relative to the coil in order to create a time-varying rate change of magnetic flux in order to induce the voltage in the coil.

In some embodiments, the magnet may be composed of a stacked magnet configuration. For example, in some embodiments, a stationary magnet may be located in the coil. In some embodiments, a generator magnet, also referred to as a "flicker" magnet, or a pivoting generator magnet may be positioned proximate to and above the stationary magnet. Together, the generator magnet and the stationary magnet may form the stacked magnet configuration. In some embodiments, movement of the generator magnet relative to the coil may induce a voltage within the coil positioned in the casing. For example, the generator magnet may be pivoted by the actuator from a first position, in which the generator magnet is aligned with the stationary magnet along a longitudinal axis that is orthogonal to a plane along which the coil is disposed, to a second position, in which the generator magnet is no longer aligned with the stationary magnet along the longitudinal axis, and then released by the actuator such that the generator magnet returns to the first position.

In some embodiments, when the generator magnet returns to the first position from the second position it may be subject to a large restoring magnetic force applied, for example, by the stationary magnet. In such an embodiment, the generator magnet may oscillate with respect to the stationary magnet before coming to a stationary position. For example, the generator magnet may experience maximum velocity due to great kinetic energy as it reaches the vertical rest position. Any residual kinetic energy (i.e., energy remaining after the completion of the kinetic-to-electrical energy conversion process) may dissipate such that the generator magnet comes to rest on the stationary magnet based on the interface between the generator magnet and the stationary magnet. For example, if the stationary magnet and the generator magnet form a sharp pointed interface, the generator magnet may oscillate about the sharp pointed interface due to the overshoot from the kinetic energy fighting the strong magnetic coupling forces tending to stabilize the generator magnet in the vertical rest position. If the stationary magnet and the generator magnet form a flat interface, the flat interface may prevent the generator magnet from drastic overshoot and oscillation about the stationary magnet during the residual kinetic energy dissipation event.

In some embodiments, the movement of a generator magnet from a first position to a second position or from a second position to a first position with acceleration would induce energy having opposite pulse polarity. However, the magnitude of the time-rate change of magnetic flux, responsible for magnitude of electromagnetic induction, is dependent on the magnitude of the acceleration, or the force, with which the generator magnet is transitioned from a first position to a second position or vice versa.

Optionally, the generator magnet and the stationary magnet may be configured to have the same magnetic pole orientation when the generator magnet and the stationary magnet are both aligned along the longitudinal axis. For example, the generator magnet may be configured to have a North-South magnetic pole position and be oriented on top of a stationary magnet also having a North-South magnetic pole position. Accordingly, an energy harvesting generator may include a generator magnet that is configured to produce a time-varying magnetic flux that results in electromagnetic induction in a coil.

Figure 1B:
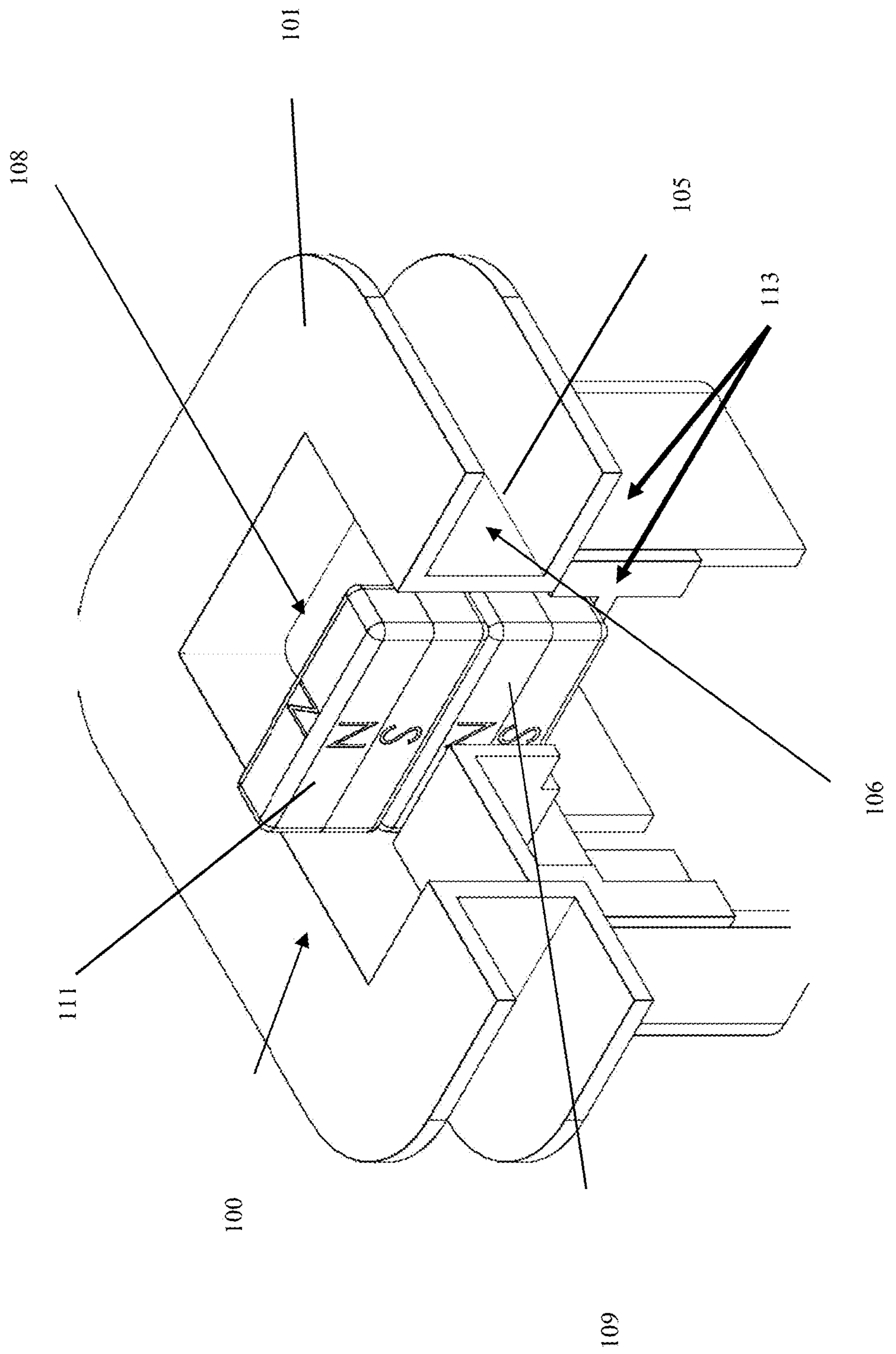
FIG. 1B illustrates a cross-sectional, first perspective view of an energy harvesting generator in accordance with some embodiments of the present disclosure.
Figure 2:
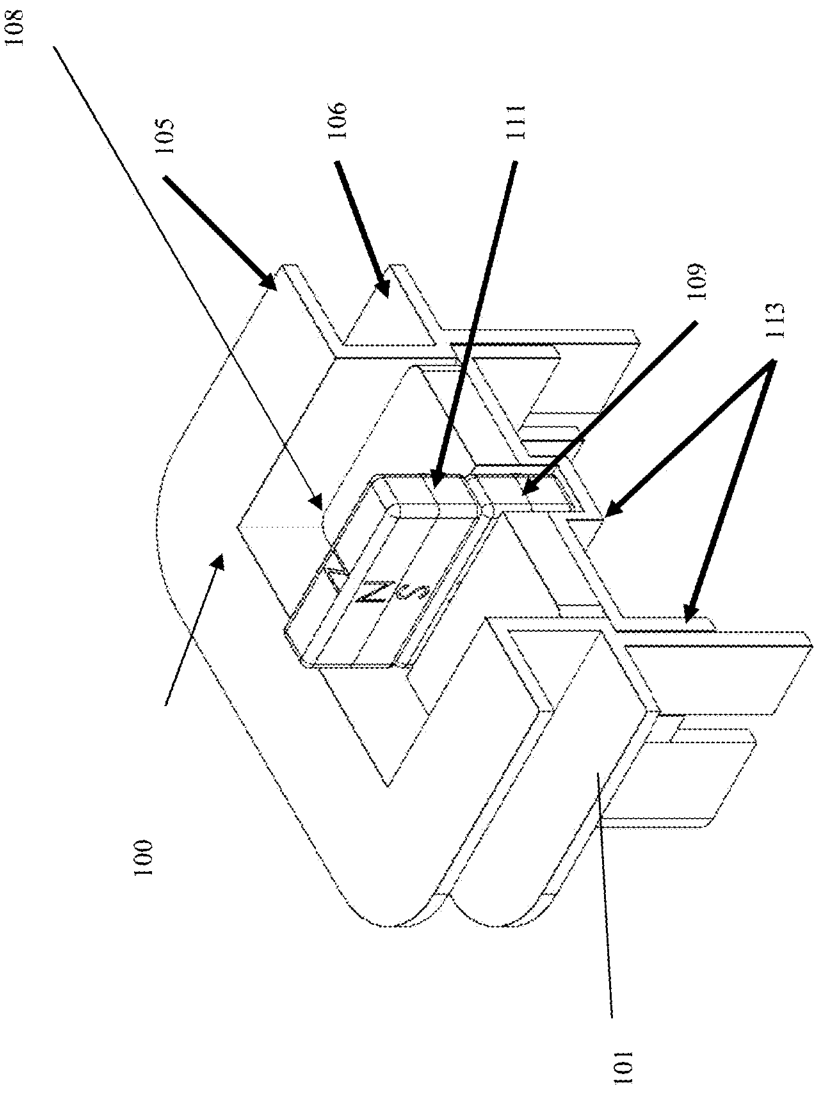
FIG. 2 provides a section view of the energy harvesting generator of FIG. 1 in accordance with some embodiments of the present disclosure.

FIG. 1A illustrates a first perspective view of an exemplary energy harvesting generator 100 that, in accordance with some embodiments of the disclosure, is configured to generate a voltage for use in various power applications. FIG. 1B provides a first cross-sectional view of the energy harvesting generator 100 of FIG. 1B. In FIG. 1B a portion of the casing 101 is removed, so that the interior of the energy harvesting generator 100 is visible. FIG. 2 provides a second cross-sectional view of the energy harvesting generator 100 of FIGS. 1A and 1B. As illustrated in FIG. 1A, the energy harvesting generator 100 may include a casing 101 that is configured to retain one or more of the components of the energy harvesting generator. The casing 101 may be composed of molded plastic or similar materials. The casing 101 may include a bobbin 105 having a recess 106 configured to hold a plurality of turns of wire that form a coil (not shown, see FIG. 3).

In some embodiments, the bobbin 105 and substrate 113 combined may form a casing 101 that may have a central area 108 that is located within the bobbin and configured to house one or more magnets of the energy harvesting generator 100. For example, the energy harvesting generator 100 may include a generator magnet 111 that is positioned in the central area 108 of the casing 101. In some embodiments, the generator magnet 111 may be positioned central to the wired coil such that the generator magnet 111 has a magnetic field mostly normal to the wired coil plane at rest position. In some embodiments, the energy harvesting capabilities of the generator 100 is agnostic to the initial positioning of the generator magnet with respect to the wired coil, in that, so long as the generator magnet is displaced and returned to its original position such that it presents the coil to a time-varying magnetic field, the generator magnet will contribute towards the generation of energy.

Optionally, in some embodiments, the generator magnet 111 may be positioned to be vertically stacked upon a stationary magnet 109 that is positioned substantially within the center of the casing 101. In this manner, the generator magnet 111 and the stationary magnet 109 may form a stacked magnet configuration. As illustrated in FIG. 2, the casing 101 may include a base or substrate 113 configured to hold the stationary magnet 109.

As shown in FIGS. 1A, 1B, and 2, the generator magnet 111 and the stationary magnet 109 are rectangular-shaped bar magnets. However, the magnets of the generator 100, such as the stationary magnet and generator magnet, may have any other shape as appropriate for the application in which the generator 100 is implemented. In addition, the coil may be arranged such that it is wound on a plane that is positioned such that interactions of the magnetic field during positional motion extremes of the generator magnet create mostly perpendicular magnetic flux lines followed by mostly horizontal magnet flux lines thus giving rise to substantial rates of change of magnetic flux for maximum coil voltage induction. The wired coil may be formed from any suitable shape such as a circle, square, oval, or rectangular shape. The shape of the coil may depend on a shape of the bobbin 105, which also may be formed from any suitable shape such as a circle, square, oval, or rectangular shape.

As discussed above, the generation of energy by the generator magnet is agnostic of the positioning of the stationary magnet or generator magnet with respect to the wired coil. Instead, generation of energy by the generator magnet is dependent on the change in position of the generator magnet causing a change in magnetic flux so as to generate energy. In some embodiments, the amount of energy generated may be proportional to the rate of change of the magnet as it moves from a first to a second position. The movement of the generator magnet may create a change in magnetic flux, which induces energy generation in the wired coil.

In some embodiments, the generator 100 may include one or more nanostructures in which a voltage can be induced, and these structures may or may not be incorporated into the generator 100 in lieu of the coil.

As referenced above, the central area 108 of the casing 101 may include one or more compartments configured to the hold the stationary magnet and/or generator magnet. In some embodiments, a compartment of the central area 108 that is configured to hold the generator magnet may be sized configured such that the generator magnet is able to pivot from a first position, in which the generator magnet is aligned with the stationary magnet along a longitudinal axis that is orthogonal to a plane along which the coil is disposed, to a second position, in which the generator magnet is no longer aligned with the stationary magnet along the longitudinal axis, while at least a portion of the generator magnet remains within the compartment. Alternatively, in some embodiments, only a stationary magnet, ferrous steel block or flexure may be retained by a compartment of the casing, and the generator magnet may be positioned central to the coil based on the coupling of the generator magnet with one of the stationary magnet, ferrous steel block, or flexure, such that the generator magnet is substantially within the plane along which the coil is disposed when the first position referenced above. Further, the stationary magnet, ferrous steel block, or flexure may be configured to provide a restoring force on the generator magnet when the generator magnet is in the displaced position.

Figure 3:
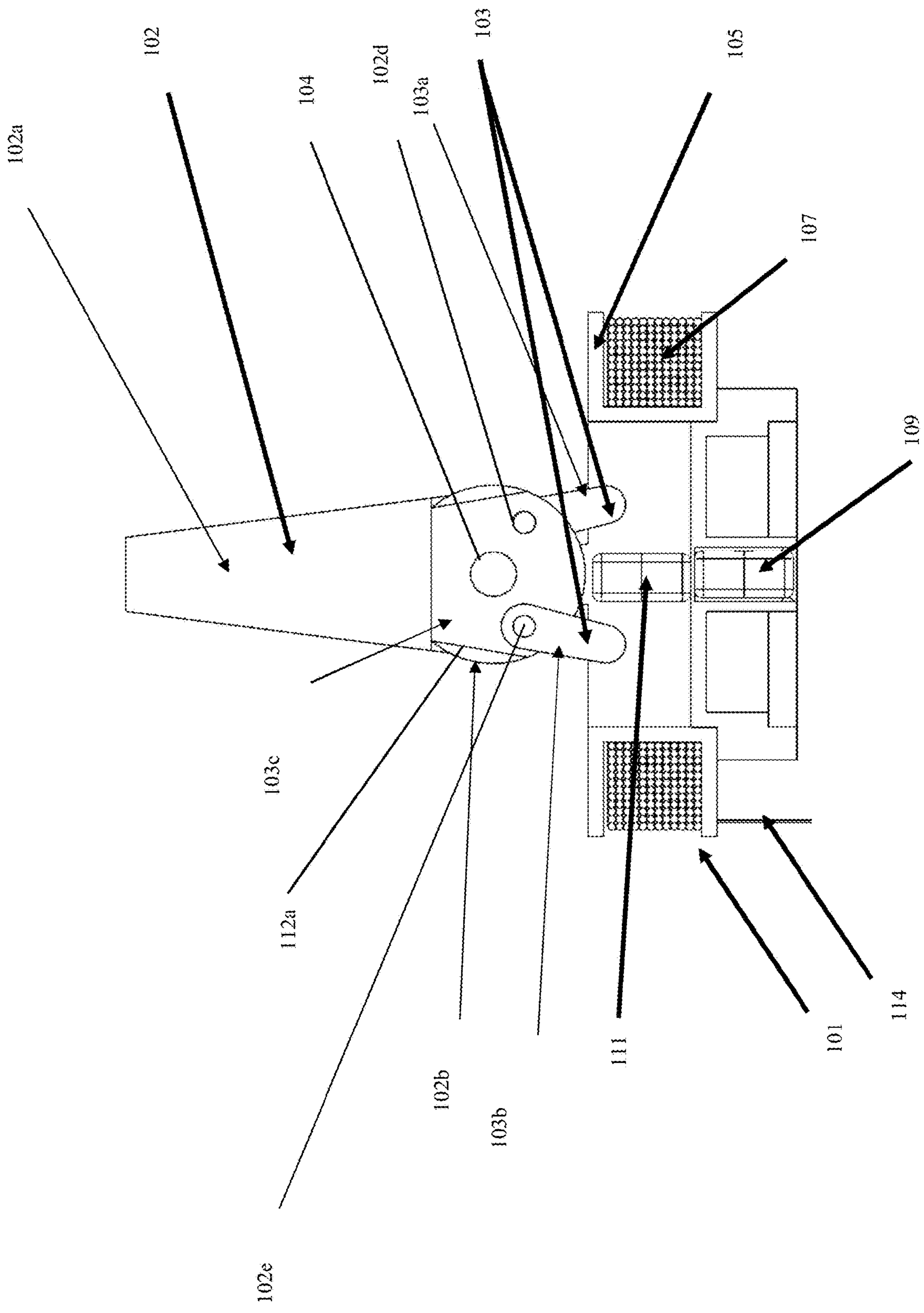
FIG. 3 provides a section view of the energy harvesting generator of FIG. 1 in accordance with some embodiments of the present disclosure.

FIG. 3 provides a section view of the energy harvesting generator 100 and an exemplary actuation lever 102 across a medial plane of the energy harvesting generator 100 and the actuation lever 102. The actuation lever 102 is configured to cause the generator magnet 111 to pivot from a first position to a second position. The actuation lever 102 may have a first end 102*a* configured to interface with a user or mechanical interface. A second end 102*b* of the actuation lever 102 may be positioned adjacent to the casing 101 and/or the generator magnet 111 and have a substantially rounded shape, although any alternative shape may be used. The actuation lever 102 may also have a hole 104 though which a pin (see FIGS. 5A-5F) may be inserted such that the actuation lever 102 is configured to rotate about the pin in both the clockwise and counterclockwise directions. As illustrated, the energy harvesting generator 100 may include a bobbin 105 with a recess 106 configured to hold a wire coil 107 with a coil terminal 114.

As shown in FIG. 3, the second end 102*b* of the actuation lever 102 may include one or more drive lobes 103 that are configured to engage the generator magnet 111. Although an embodiment with two drive lobes 103 is illustrated in FIG. 3, in some embodiments, a single drive lobe may provide one-directional operation. In some embodiments, the drive lobes 103 may be spring-loaded. In some embodiments, at least a portion of the drive lobes 103 may be composed of one or more compliant materials. As shown in this exemplary embodiment, the actuation lever 102 includes two drive lobes, but, in some embodiments, the actuation lever 102 may include any number of drive lobes as needed for the application in which the generator is installed. The two drive lobes 103*a* 103*b* may be spaced apart and pinned on opposing sides of the actuation lever 102. As shown, each of the drive lobes 103*a*, 103*b* may include a protrusion configured to be inserted into a corresponding hole formed in the second end 102*b* (e.g., hole 102*d*, 102*e*) such that the drive lobes 103 are coupled to the second end 102*b* of the actuation lever 102. As shown, the protrusion of each of the drive lobes 103, and the corresponding holes into which they are inserted, feature a circular cross-section, such that the drive lobes 103 are configured to rotate about the protrusion and relative to the actuation lever 102. When coupled to the second end 102*b*, the drive lobes 103 may be housed in one or more recesses. For example drive lobe 103*b* is housed in a recess 103*c*. The angle of rotation for each drive lobe may be bounded by one or more retaining walls of the recess in which the drive lobe is housed. As illustrated in the section view of FIG. 3, the retaining wall 112*a* of the recess 103*c* in which the drive lobe 103*b* is positioned is configured to constrain the rotation of the drive lobe 103 when coupled to the actuation lever 102, as explained in further detail below.

Although a first actuation mechanism utilizing a rotation based actuator is described in FIG. 3 and herein, alternative mechanisms for actuation are envisioned. For example, the actuation mechanism may involve a linear translated actuator with drive lobes analogous to those described herein. Alternative actuation mechanisms may be used.

Additionally, in some embodiments the actuation mechanism may be coupled by a mechanism providing a directional signal. For example, in some embodiments, a component of the actuation mechanism, for example, a switch may contact a hall-effect sensor or other sensor configured to provide information regarding the direction of actuation. A hall-effect sensor, proximity sensor, and the like may provide directional information in the case where the polarity of the initial rising edge pulse cannot be distinguished due to symmetry in the electromagnetic induction. Such sensors may be embedded in the actuator, and can provide directional indication and decoding. These techniques may provide for direction of actuation and a return-to-center indication as may be required of applications. Alternatively, the energy harvesting generator may include a coil polarity detection method in which the actuation direction is determined from information obtained from the voltage induced in the coils. For example, the coil polarity based detection method may use the initial polarity (i.e., positive going, or negative going energy pulse) of the generation pulse to determine the direction of actuation. The directionality of actuation corresponding to the directional signal may be used in various applications. For example, the directional signal may indicate an open or close signal.

Figure 4A:
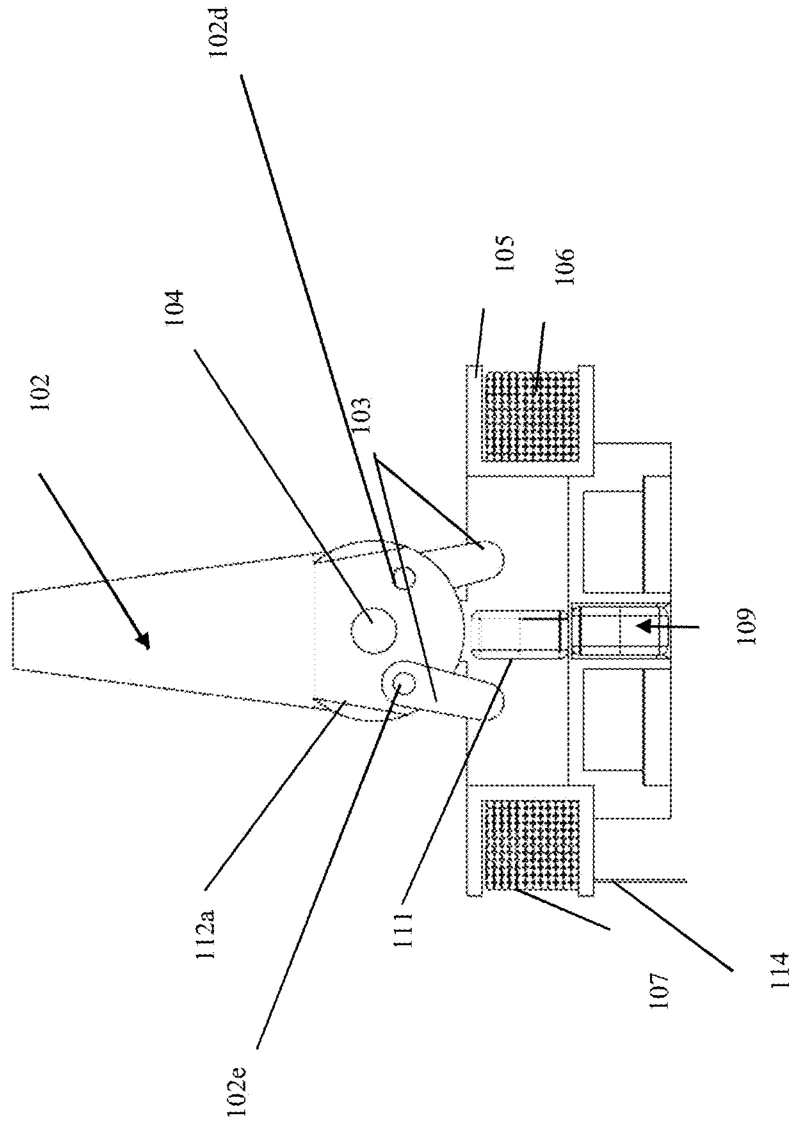
FIG. 4A provides a section view of the energy harvesting generator during a first phase of an energy generation cycle in a first direction in accordance with some embodiments of the present disclosure.
Figure 4B:
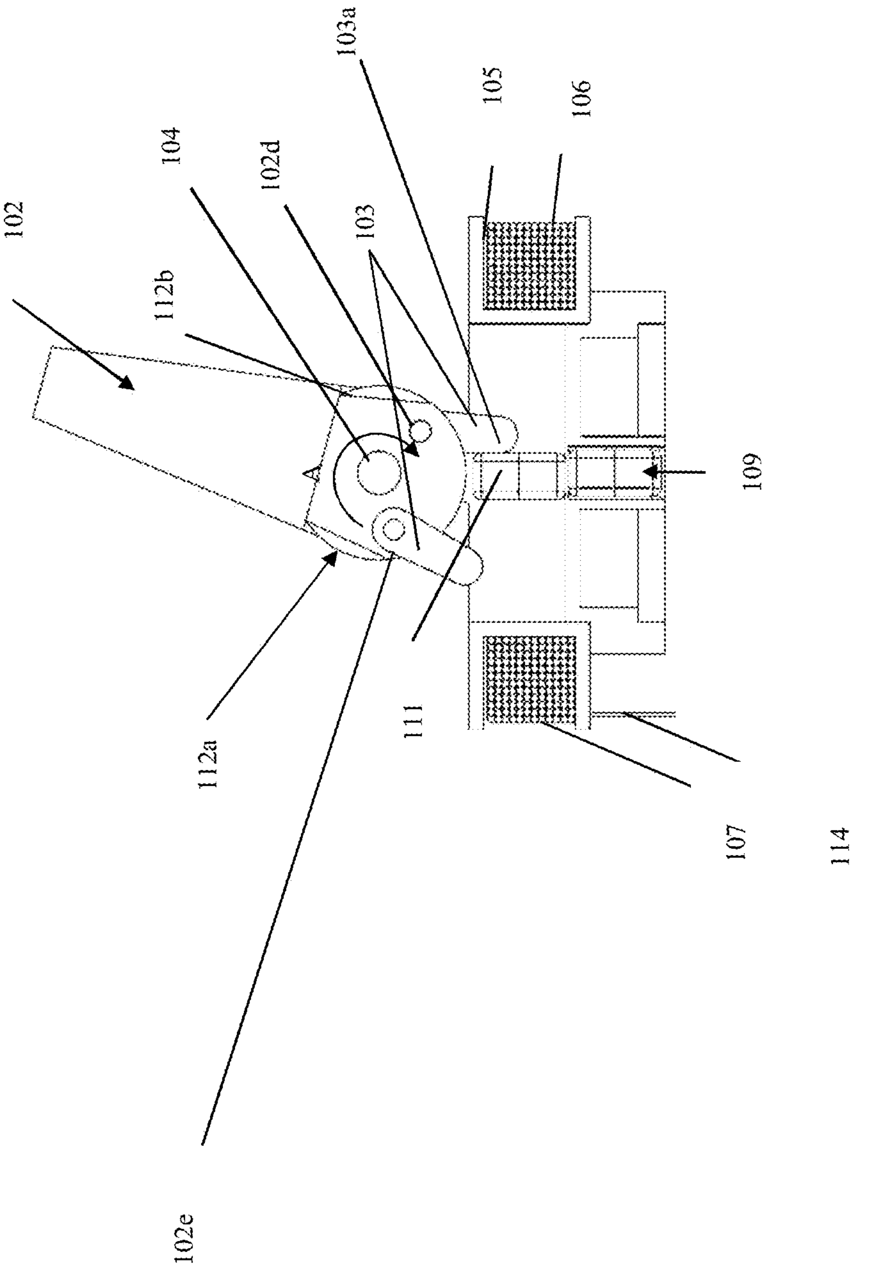
FIG. 4B provides a section view of the energy harvesting generator during a second phase of an energy generation cycle in a first direction in accordance with some embodiments of the present disclosure.
Figure 4C:
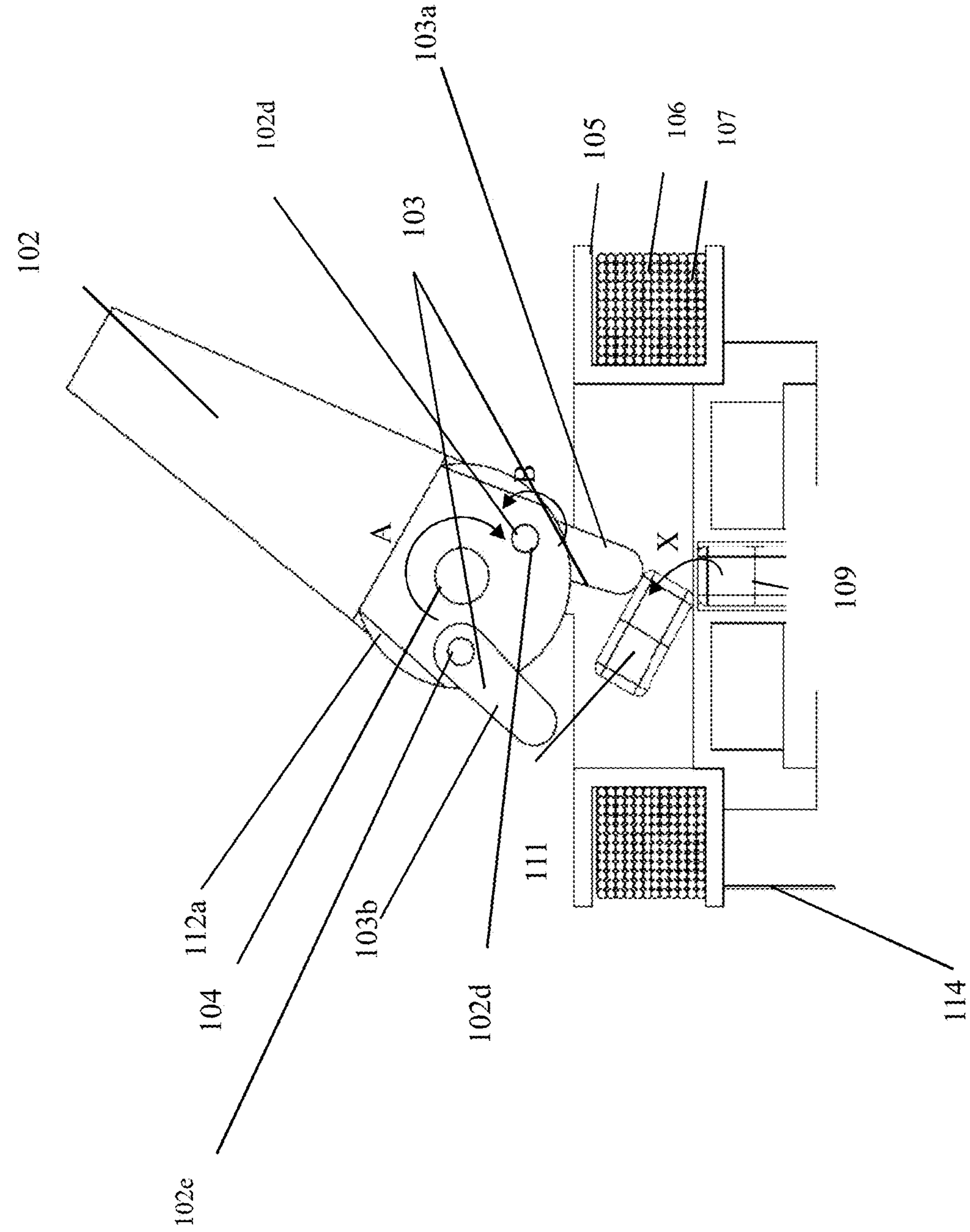
FIG. 4C provides a section view of an energy harvesting generator during a third phase of an energy generation cycle in a first direction in accordance with some embodiments of the present disclosure.
Figure 4D:
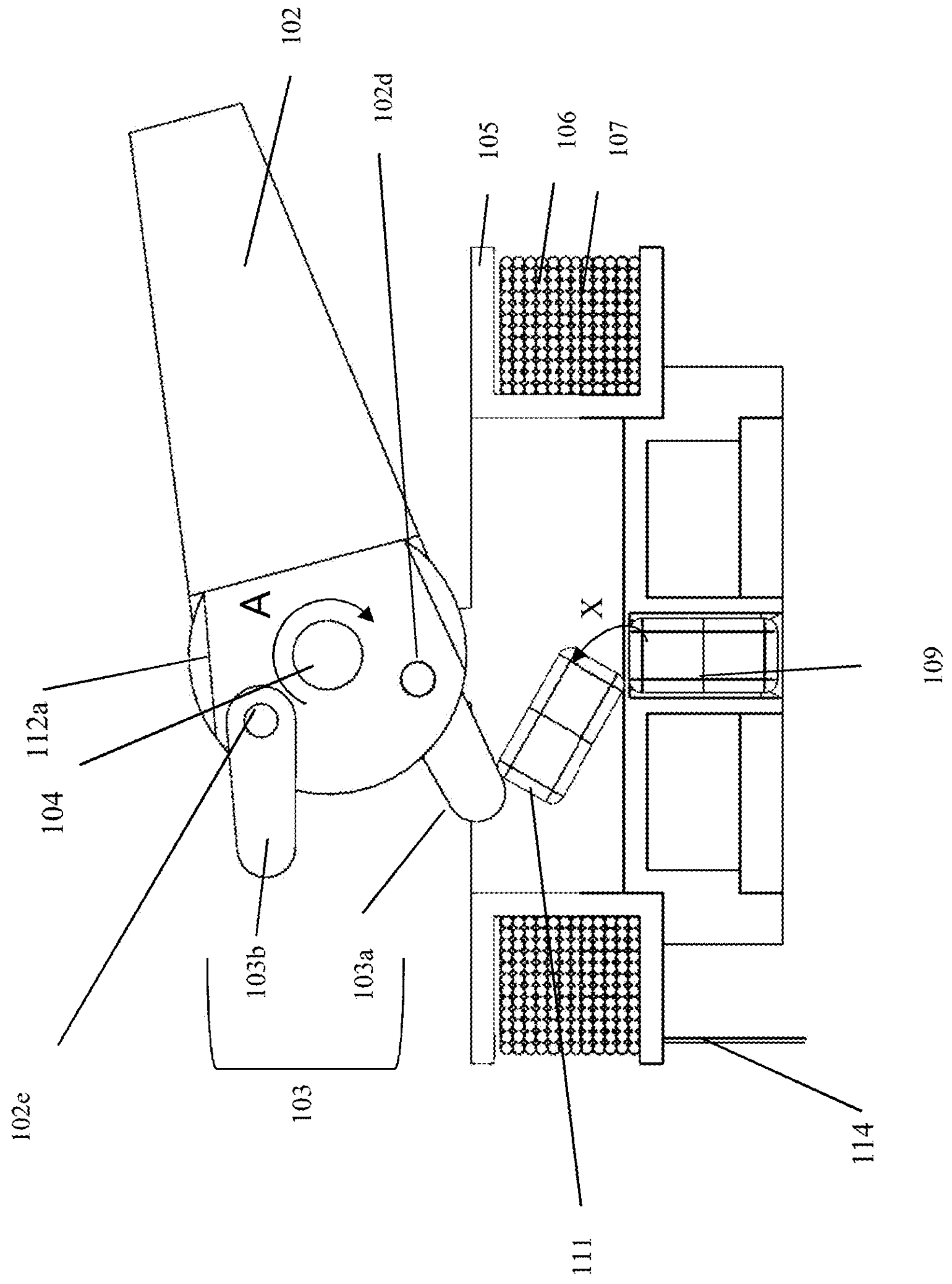
FIG. 4D provides a section view of an energy harvesting generator during a fourth phase of an energy generation cycle in a first direction in accordance with some embodiments of the present disclosure.
Figure 4E:
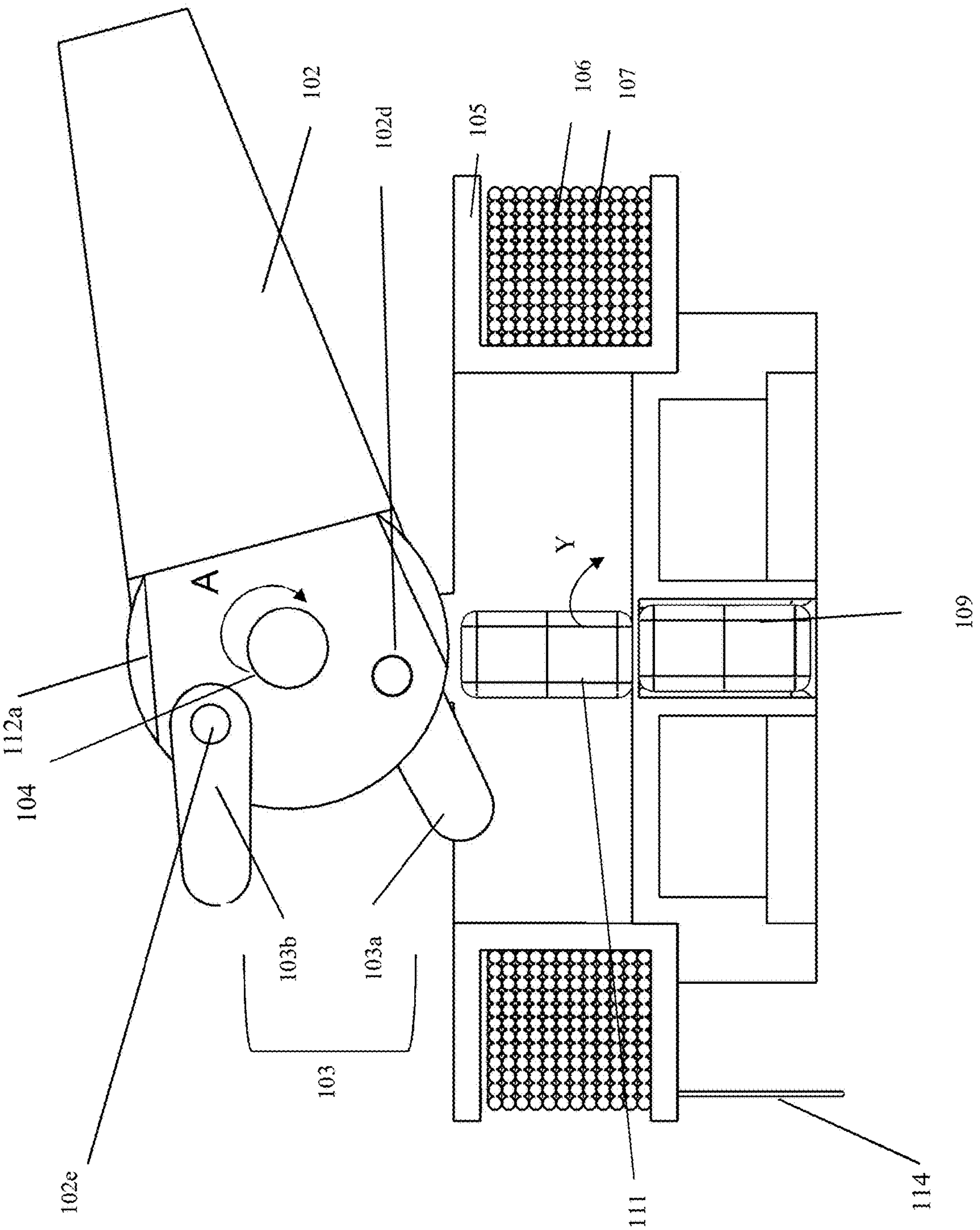
FIG. 4E provides a section view of an energy harvesting generator during a fifth phase of an energy generation cycle in a first direction in accordance with some embodiments of the present disclosure.
Figure 4F:
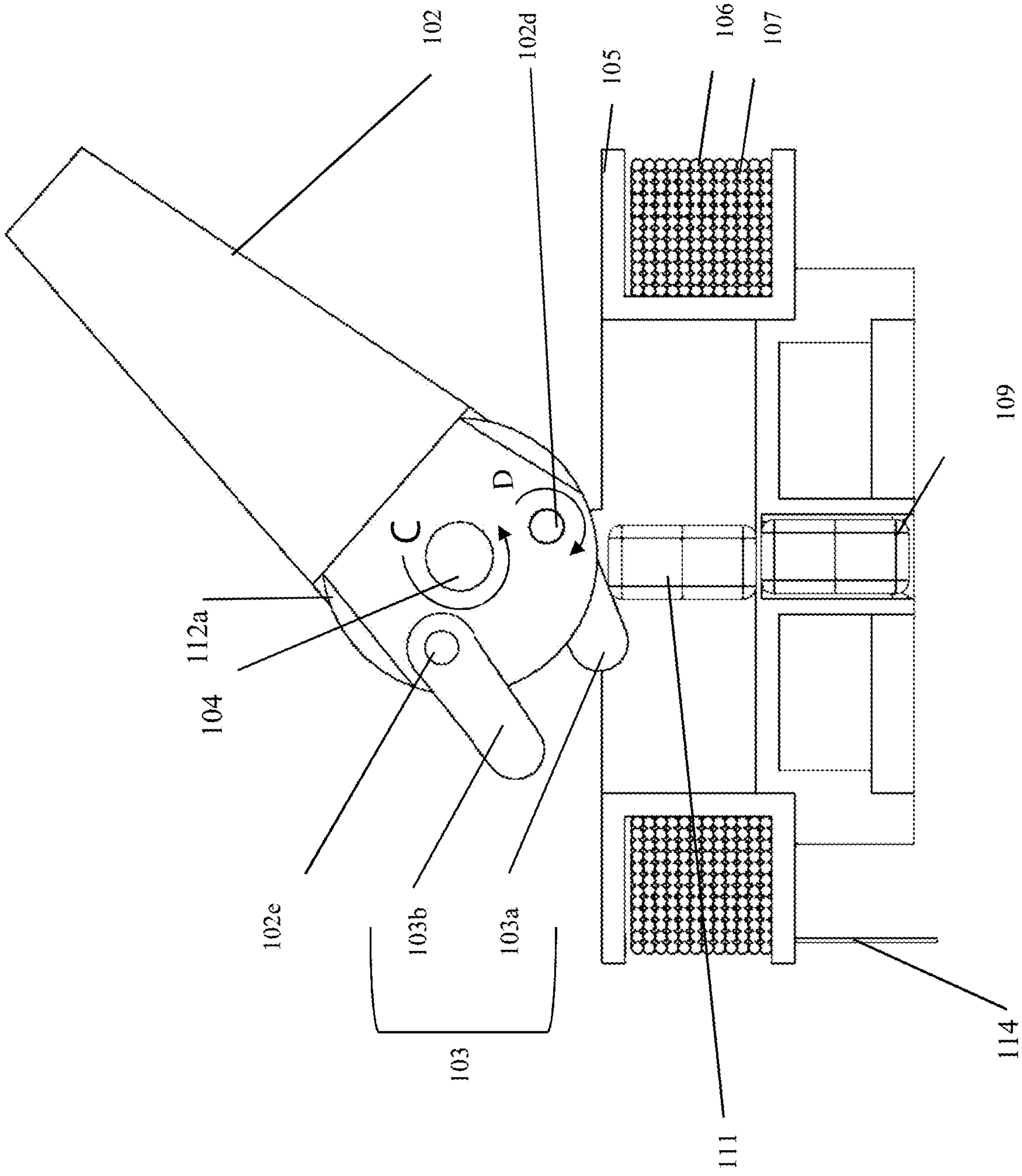
FIG. 4F provides a section view of an energy harvesting generator during a sixth phase of an energy generation cycle in a first direction in accordance with some embodiments of the present disclosure.
Figure 4G:
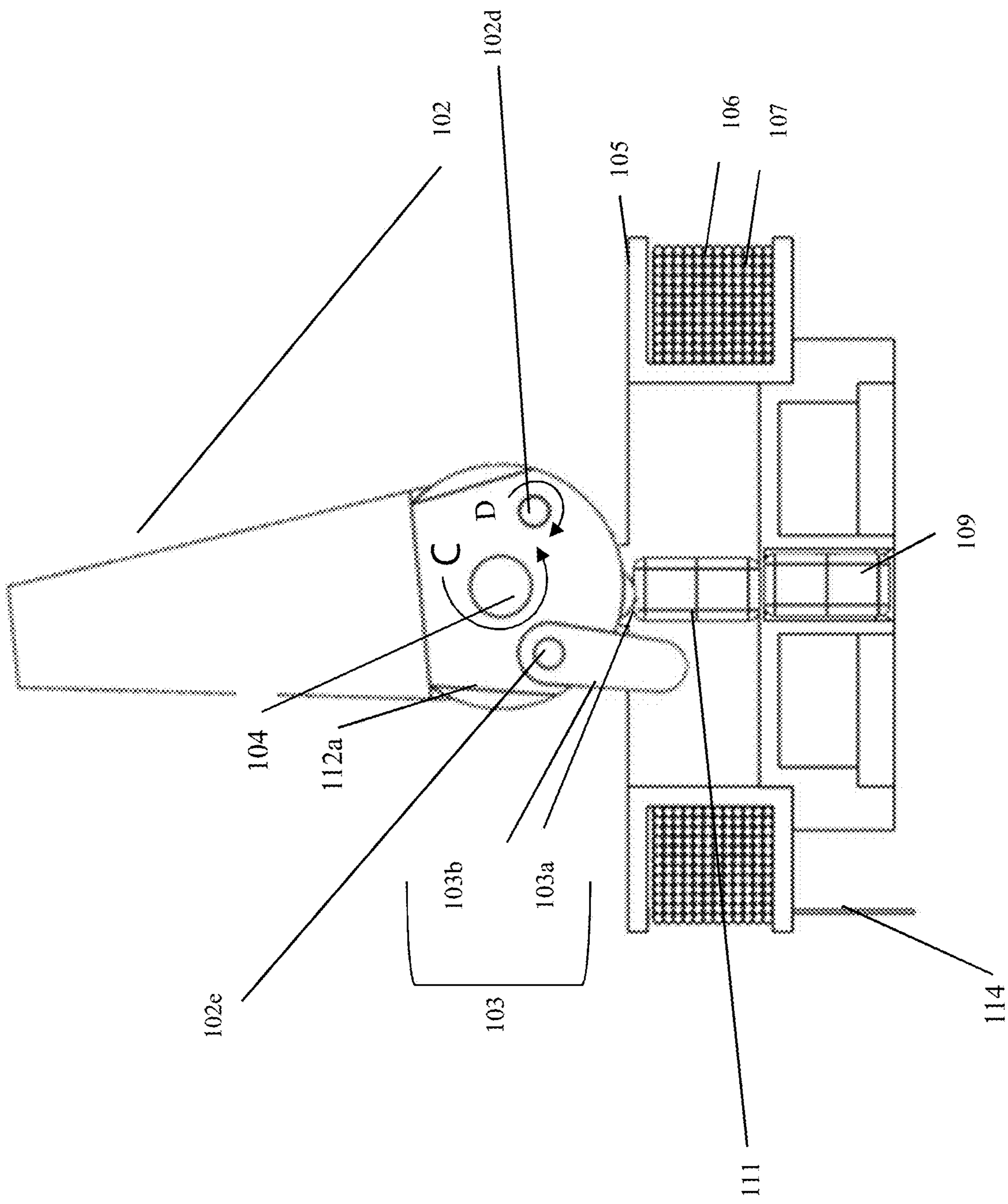
FIG. 4G provides a section view of an energy harvesting generator during a seventh phase of an energy generation cycle in a first direction in accordance with some embodiments of the present disclosure.
Figure 4H:
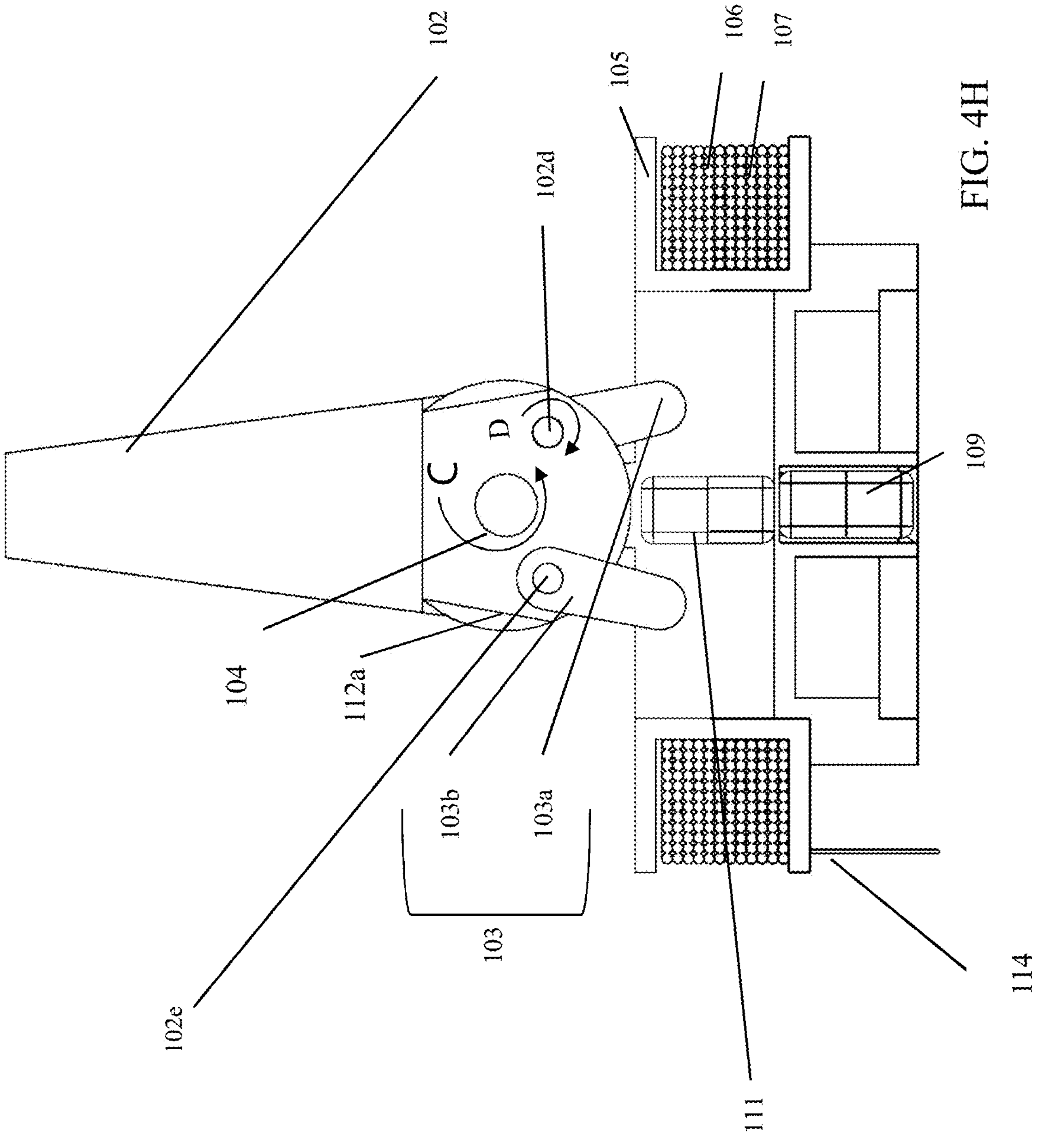
FIG. 4H provides a section view of an energy harvesting generator during an eighth phase of an energy generation cycle in a first direction in accordance with some embodiments of the present disclosure.
Figure 4I:
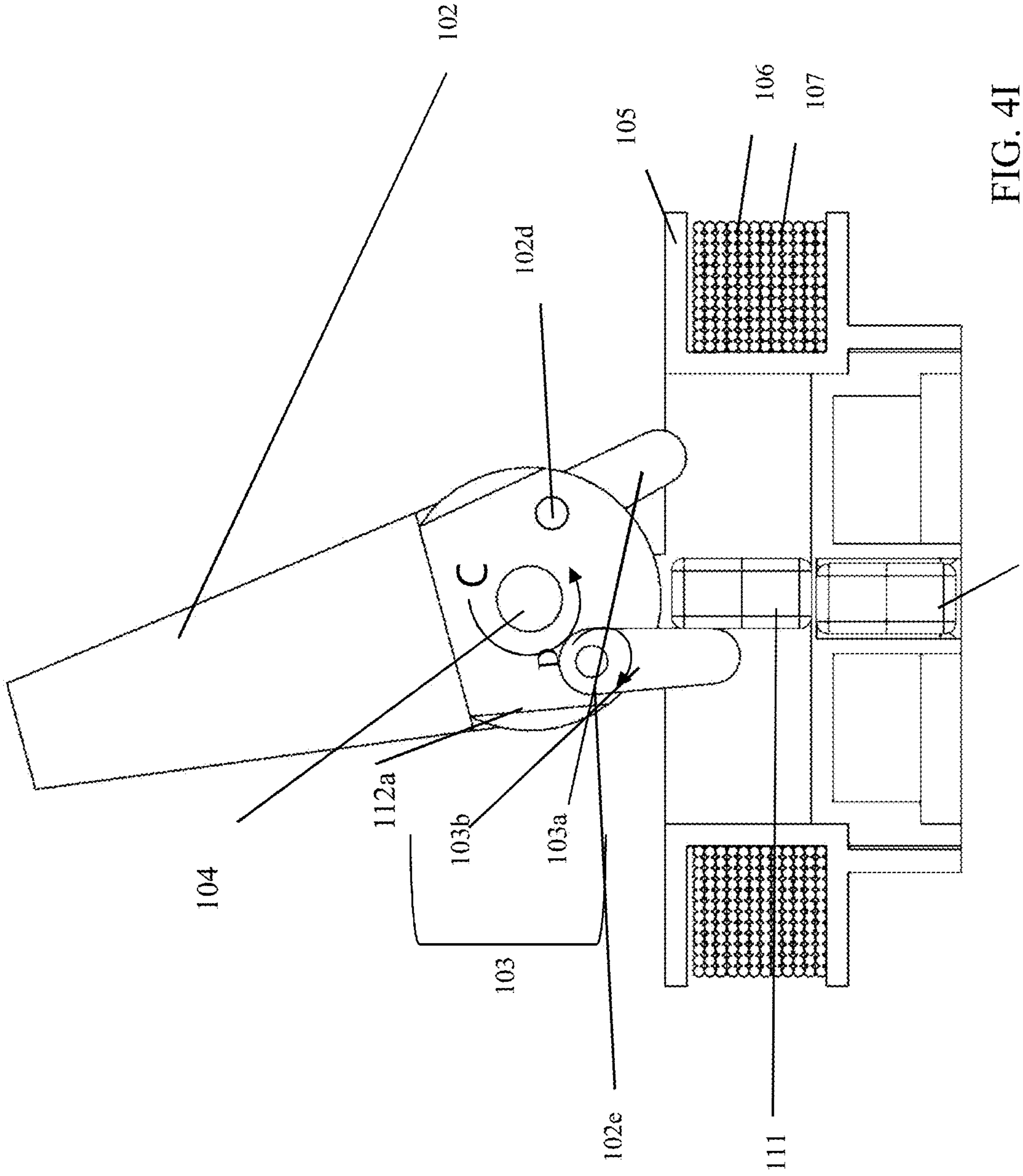
FIG. 4I provides a section view of an energy harvesting generator during a ninth phase of an energy generation cycle in a second direction in accordance with some embodiments of the present disclosure.
Figure 4J:
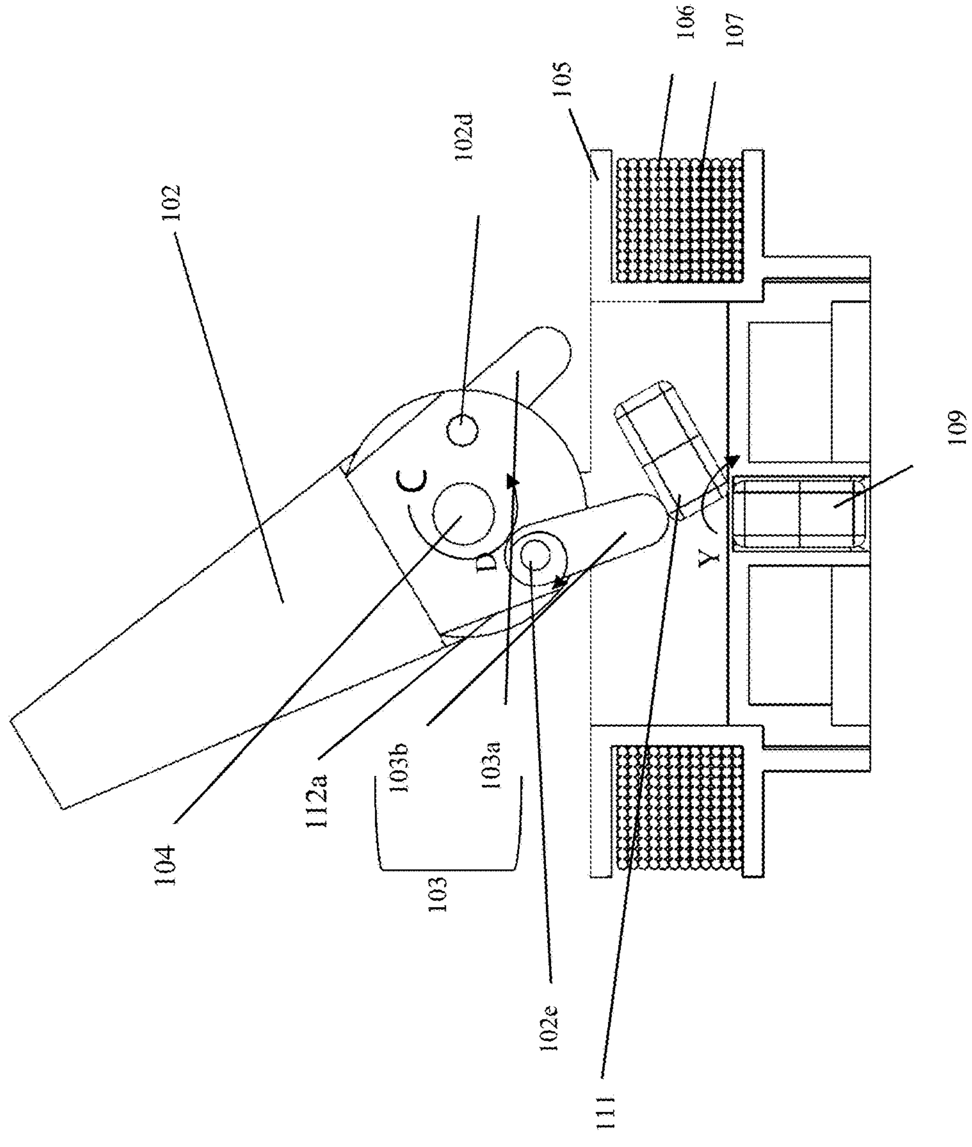
FIG. 4J provides a section view of an energy harvesting generator during a tenth phase of an energy generation cycle in a second direction in accordance with some embodiments of the present disclosure.
Figure 4K:
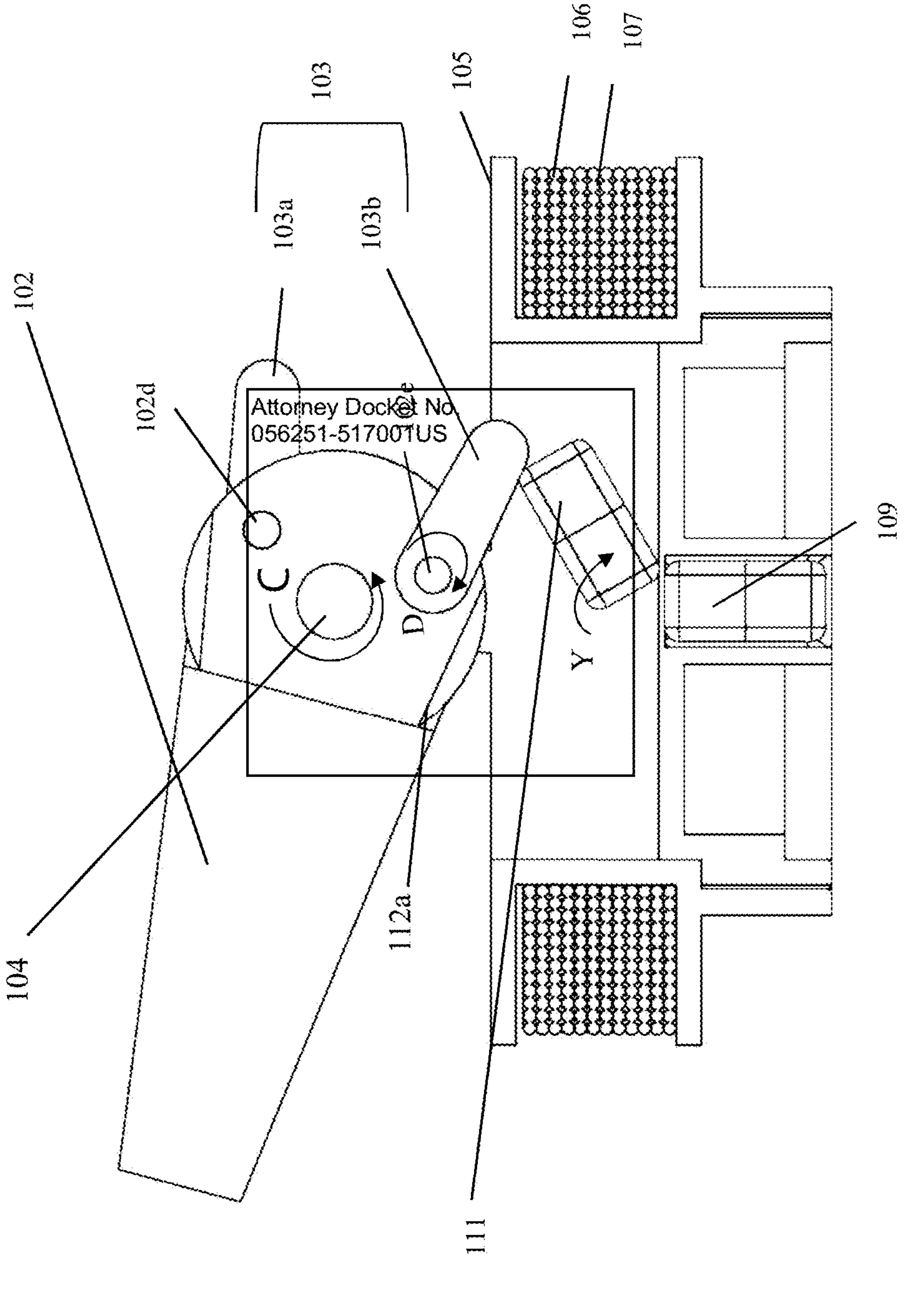
FIG. 4K provides a section view of an energy harvesting generator during a eleventh phase of an energy generation cycle in a second direction in accordance with some embodiments of the present disclosure.
Figure 4L:
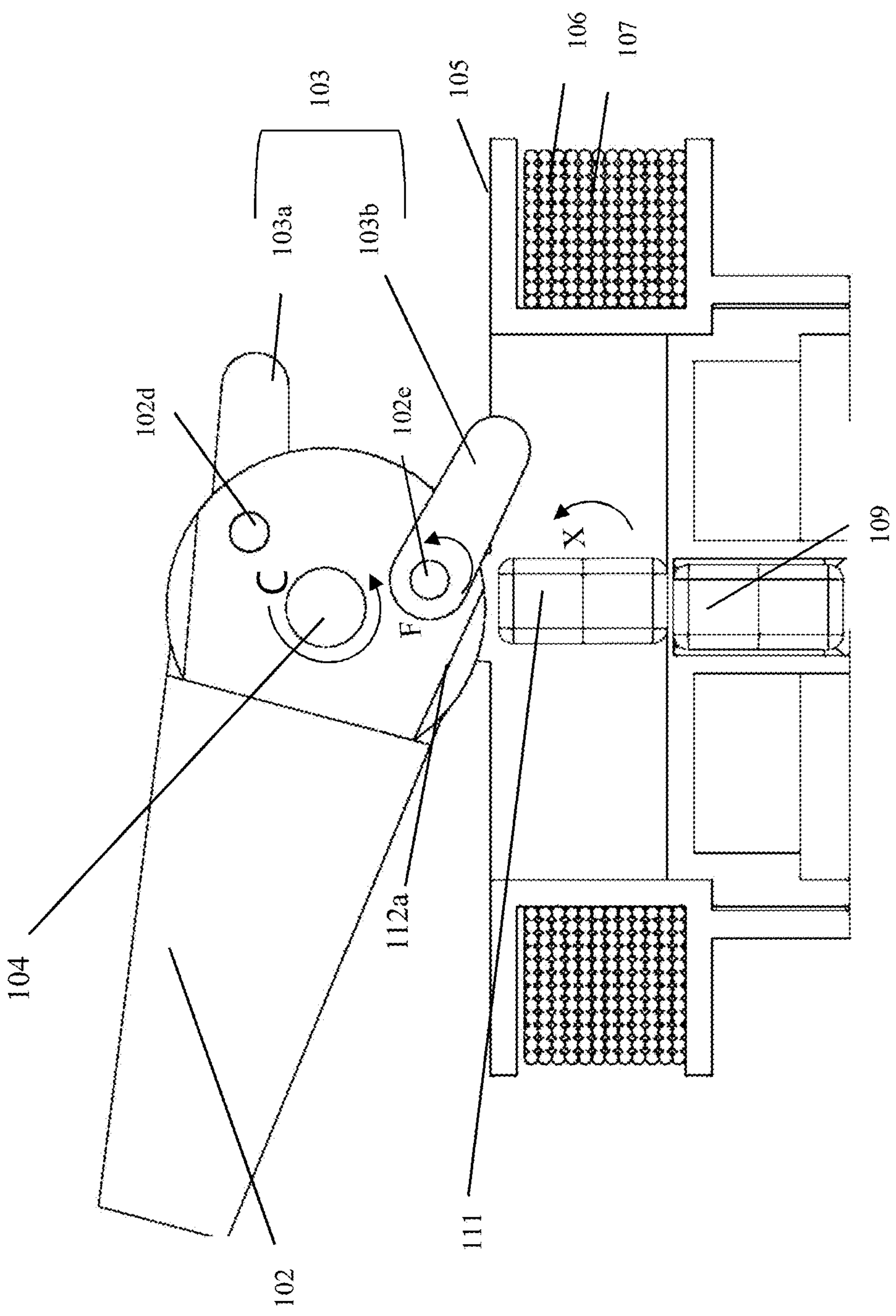
FIG. 4L provides a section view of an energy harvesting generator during a twelfth phase of an energy generation cycle in a second direction in accordance with some embodiments of the present disclosure.
Figure 4M:
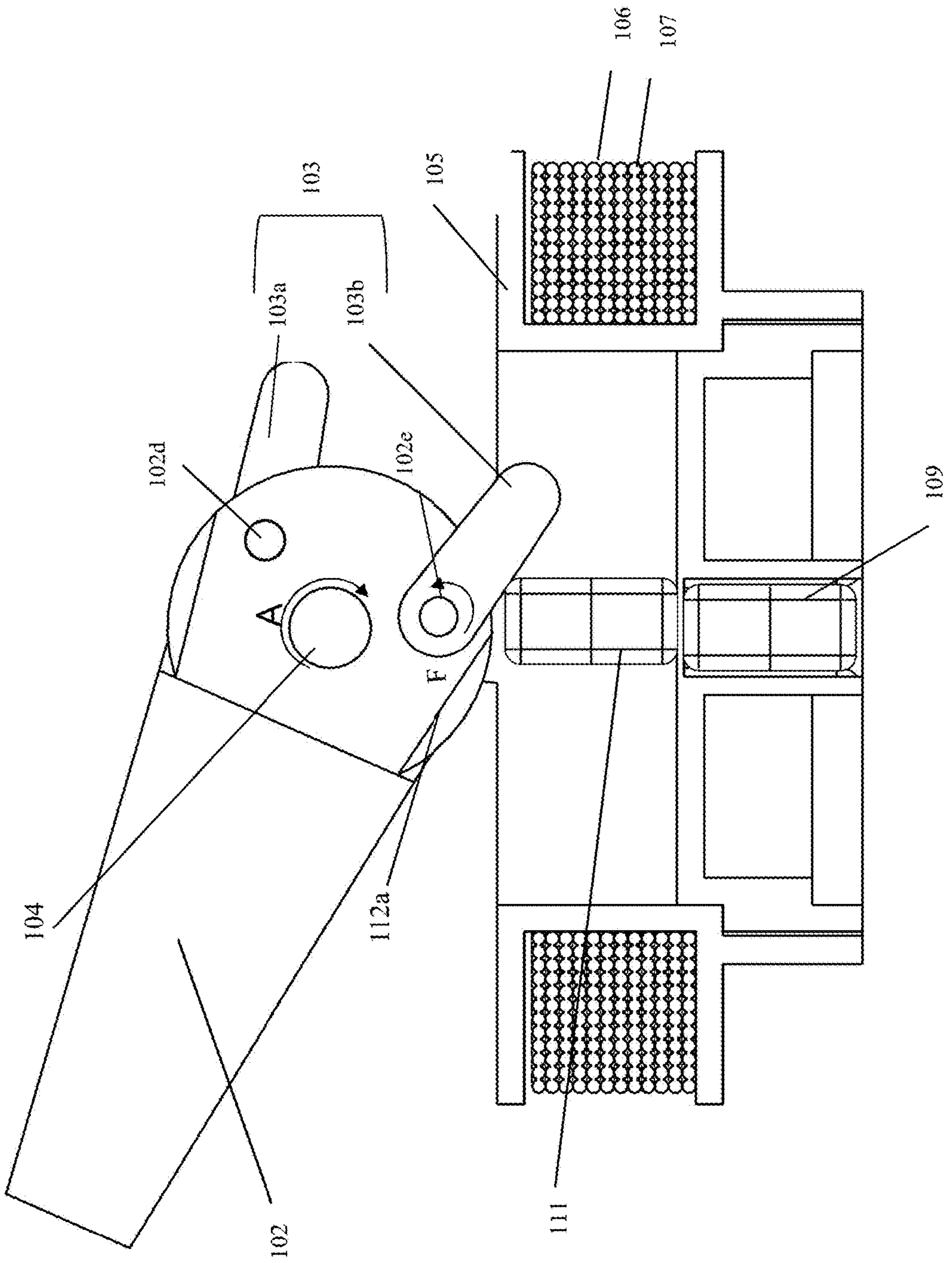
FIG. 4M provides a section view of an energy harvesting generator during a thirteenth phase of an energy generation cycle in a second direction in accordance with some embodiments of the present disclosure.
Figure 4N:
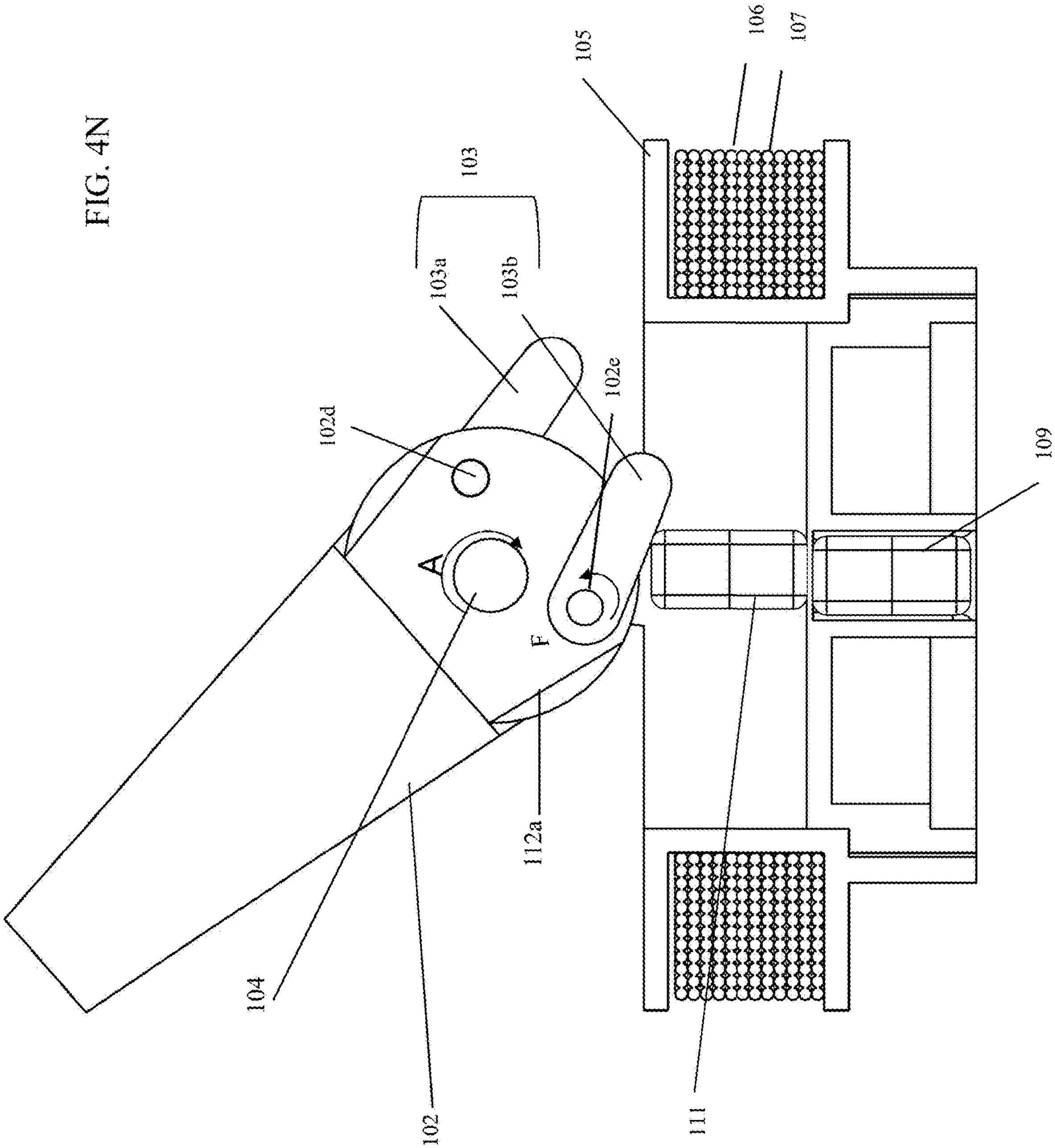
FIG. 4N provides a section view of an energy harvesting generator during a fourteenth phase of an energy generation cycle in a second direction in accordance with some embodiments of the present disclosure.
Figure 4O:
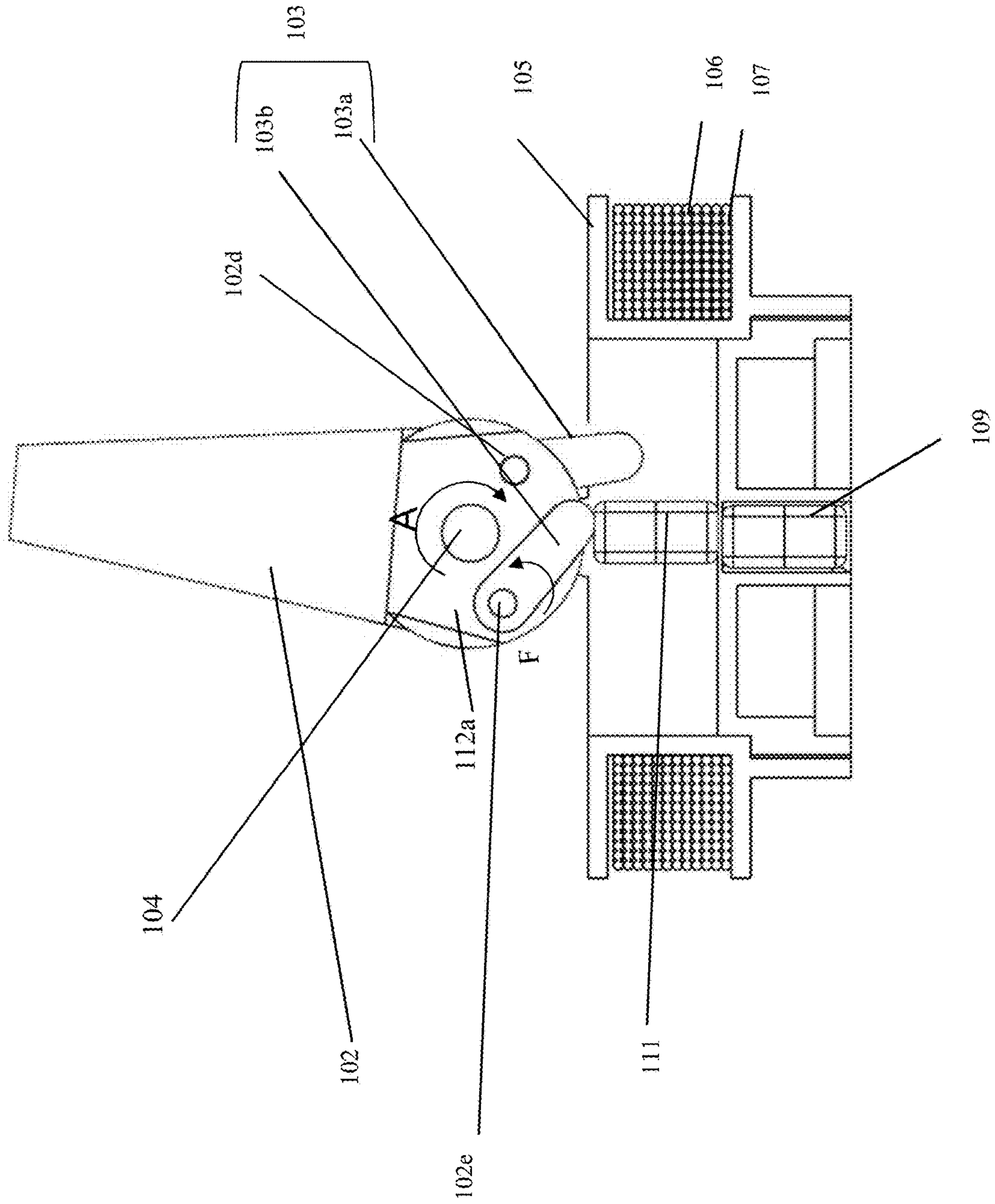
FIG. 4O provides a section view of an energy harvesting generator during a fifteenth phase of an energy generation cycle in a second direction in accordance with some embodiments of the present disclosure.

FIGS. 4A-4O illustrate section views of the energy harvesting generator 100 and actuation lever 102 in a time-lapse sequence of various configurations in which voltage is induced in the coil through actuation of the generator magnet 109 during one or more energy generation cycles. More specifically, FIG. 4A illustrates a section view of the energy harvesting generator 100 and actuation lever 102 during a first phase in which the generator is in a normal rest state. As shown, the actuation lever 102 is in a neutral position, where the two drive lobes 103 are spaced apart and no contact is made between either of the drive lobes 103 and the generator magnet 111. As shown, the generator magnet 111 is positioned between the two drive lobes 103. At this phase, the generator magnet 111 is in a first position in which the generator magnet 111 is aligned with the stationary magnet 109 along a longitudinal axis that is orthogonal to the plane along which the coil is disposed. The coil 107 with coil terminal 114 may be disposed within a bobbin 105, and more specifically, within a bobbin recess 106 of the bobbin 105 as shown in FIG. 1A.

FIG. 4B illustrates a section view of the energy harvesting generator 100 and actuation lever 102 during a second phase of the actuation of the generator magnet 111 by the actuation lever 102. In this phase, the generator magnet 109 begins to be actuated by the actuation lever 102. The actuation lever 102 is rotated about the pin inserted into hole 104 in a direction A about the pin, until a first drive lobe 103*a* of the drive lobes 103 makes contact with the generator magnet 111.

FIG. 4C illustrates a section view of the energy harvesting generator 100 and actuation lever 102 during a third phase of the actuation of the generator magnet 111 by the actuation lever 102. As the actuation lever 102 is rotated about the pin inserted into hole 104 in a direction A about the pin, the first of the drive lobes 103*a* makes contact with the generator magnet 111, causing it to move in direction X as it pivots from the first position illustrated in FIGS. 4A and 4B and to separate with respect to the stationary magnet 109. The first drive lobe 103*a* is constrained from rotating about the hole 103*c* in a direction B by a retaining wall (not shown) that forms a boundary of a recess (not shown) in which the drive lobe 103*a* is inserted.

FIG. 4D provides a section view of the energy harvesting generator 100 and actuation lever 102 during a fourth phase of the actuation of the generator magnet 111 by the actuation lever 102. As the actuation lever 102 continues to rotate in direction A, the first of the drive lobes 103*a* ultimately overrides and clears the generator magnet 111, such that the drive lobe 103*a* is no longer contacting the generator magnet 111 as shown in FIG. 4D. In this state, the generator magnet 111 is at a position in which it has a maximum amount of separation with respect to the stationary magnet 109 throughout its range of travel in direction X during the voltage induction process.

FIG. 4E provides a section view of the energy harvesting generator 100 and actuation lever 102 during a fifth phase of the actuation of the generator magnet 111 by the actuation lever 102. As shown, the actuation lever 102 is at a position past the generator magnet 111. The generator magnet 111 pivots in direction Y to return back to its original neutral position in which it is aligned with the stationary magnet 109. The generator magnet 111 returns to its substantially vertical orientation, once actuation is removed. The actuation lever 102 is no longer in contact with the generator magnet 111. The rapid change in position of the generator magnet 111 from the second position illustrated in FIG. 4E to the first position causes electromagnetic induction in the coil.

FIG. 4F provides a section view of the energy harvesting generator 100 and actuation lever 102 during a sixth phase of the actuation of the generator magnet 111 by the actuation lever 102. In this phase, the actuation lever 102 rotates about the pin in direction C (opposite to direction A) to return to the neutral position illustrated in FIG. 4A, the drive lobe 103*a* makes contact with the generator magnet 111 and begins to rotate in direction D (opposite to direction B) such that the first drive lobe 103*a* deflects when it comes into contact with the generator magnet 111. As a result of this deflection, the first drive lobe 103*a* cannot transfer a force sufficient to cause the generator magnet 111 to separate from the stationary magnet 109 and pivot in a second direction that is opposite from the first direction illustrated in FIGS. 4B-4C.

FIG. 4G provides a section view of the energy harvesting generator 100 and actuation lever 102 during a seventh phase of the actuation of the generator magnet 111 by the actuation lever 102. In this phase, as the actuation lever 102 continues to rotate in direction C (opposite to direction A), the first drive lobe 103*a* continues to rotate in direction D and deflect to the point at which the first drive lobe 103*a* can clear the generator magnet 111.

FIG. 4H provides a section view of the energy harvesting generator 100 and actuation lever 102 during an eighth phase of the actuation of the generator magnet 111 by the actuation lever 102. In this phase, the first drive lobe 103*a* has cleared the generator magnet 111, and, in some embodiments, a spring coupled to the drive lobe 103*a* may restore the position of the lobe 103*a* to the position illustrated in FIG. 4A. In addition, the actuation lever 102 is returned to the neutral configuration also illustrated in FIG. 4A.

In some embodiments, phases one through eight of the generation cycle illustrated in FIGS. 4A-4H may correspond to a first complete energy generation cycle mediated by actuation in a first direction. In some embodiments, phases nine through fifteen of the generation cycle illustrated in FIGS. 4I-4O may correspond to a second complete energy generation cycle mediated by actuation in a second direction. Alternatively, in some embodiments, a complete energy generation cycle may be composed of phases one through fifteen illustrated in FIGS. 4A-4O.

FIG. 4I provides a section view of the energy harvesting generator 100 and actuation lever 102 during a ninth phase in which the actuation lever 102 is actuated in the opposite direction (i.e., angularly rotated in direction C) as compared to the actuation described above with respect to FIGS. 4A-4H. In this phase, the second drive lobe 103*b* makes contact with the generator magnet 111 as the actuation lever rotates about the pin inserted into hole 104 in direction C. Rotation of the second drive lobe 103*b* with respect to the lower portion of the actuation lever 102 is constrained from rotating about pin 102*e* in direction D by the retaining wall 112*a*.

FIG. 4J provides a section view of the energy harvesting generator 100 and actuation lever 102 during a tenth phase of the actuation of the generator magnet 111 by the actuation lever 102. In this phase, the first drive lobe 103*a* has cleared the generator magnet 111, and the second drive lobe 103*b* continues to make contact with the generator magnet 111, deflecting the generator magnet 111 with respect to the stationary magnet 109. Due to the presence of the retaining wall 112*a*, the second drive lobe 103*b* is unable to angularly rotate in direction D past the retaining wall 112*a* and instead deflects the generator magnet 111 as the actuation lever 102 is rotated in direction C. As the generator magnet 111 is deflected it rotates in direction Y.

FIG. 4K provides a section view of the energy harvesting generator 100 and actuation lever 102 during an eleventh phase of the actuation of the generator magnet 111 by the actuation lever 102. In this phase, the first drive lobe 103*a* has cleared the generator magnet 111, and a second drive lobe 103*b* makes contact with the generator magnet 111 as the actuation lever 102 continues to rotate in direction C (opposite to direction A). During this movement, the second drive lobe 103*b* continues to try to rotate in direction D, but is unable to angularly rotate due to the retaining wall 112*a* and so the second drive lobe 103*bs* deflect to the point at which the second drive lobe 103*b* can clear the generator magnet 111. This motion rotates the generator magnet 111 from a first position to a second position shown by direction Y.

FIG. 4L provides a section view of the energy harvesting generator 100 and actuation lever 102 during a twelfth phase of the actuation of the generator magnet 111 by the actuation lever 102. The actuation lever 102 is no longer in contact with the generator magnet 111. The change in orientation of the generator magnet 111 may induce a voltage across the coil. The second drive lobe 103*b* makes contact with the generator magnet 111 as the lobe continues to rotate in direction F away from the retaining wall 112*a*.

FIG. 4M provides a section view of the energy harvesting generator 100 and actuation lever 102 during a thirteenth phase of the actuation of the generator magnet 111 by the actuation lever 102. The actuation lever 102 reverses direction and moves in direction A, so that the second drive lobe 103*b* makes contact with the generator magnet 111. As the second drive lobe 103*a* makes contact with the generator magnet 111 it rotates in direction F. As the second drive lobe clears the generator magnet 111, the generator magnet moves in direction X back to its original position.

FIG. 4N provides a section view of the energy harvesting generator 100 and actuation lever 102 during a fourteenth phase of the actuation of the generator magnet 111 by the actuation lever 102. The actuation lever 102 reverses direction to move in direction A, so that the second drive lobe 103*b* is deflected by the generator magnet as it moves in direction F about pin 102*e*.

FIG. 4O provides a section view of the energy harvesting generator 100 and the actuator lever 102 during a fifteenth phase of the actuation of the generator magnet 111 by the actuation lever 102. The actuation lever 102 is positioned above the generator magnet 111, and the second drive lobe 103*b* is deflected by the generator magnet 111 as the actuation lever rotates about pin 104 in direction A. The second drive lobe 103*b* is deflected in direction F about pin 102*e*.

Figure 4P:
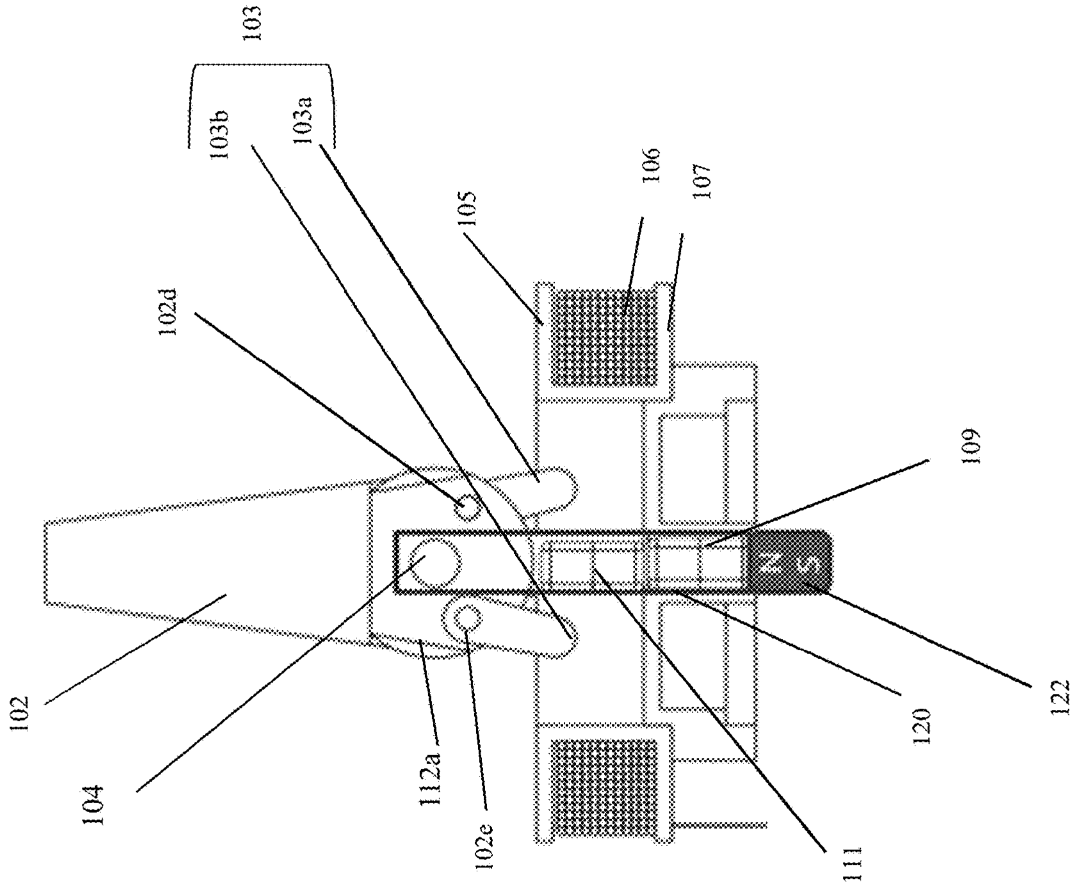
FIG. 4P provides a section view of an energy harvesting generator in accordance with some embodiments of the present disclosure.
Figure 4Q:
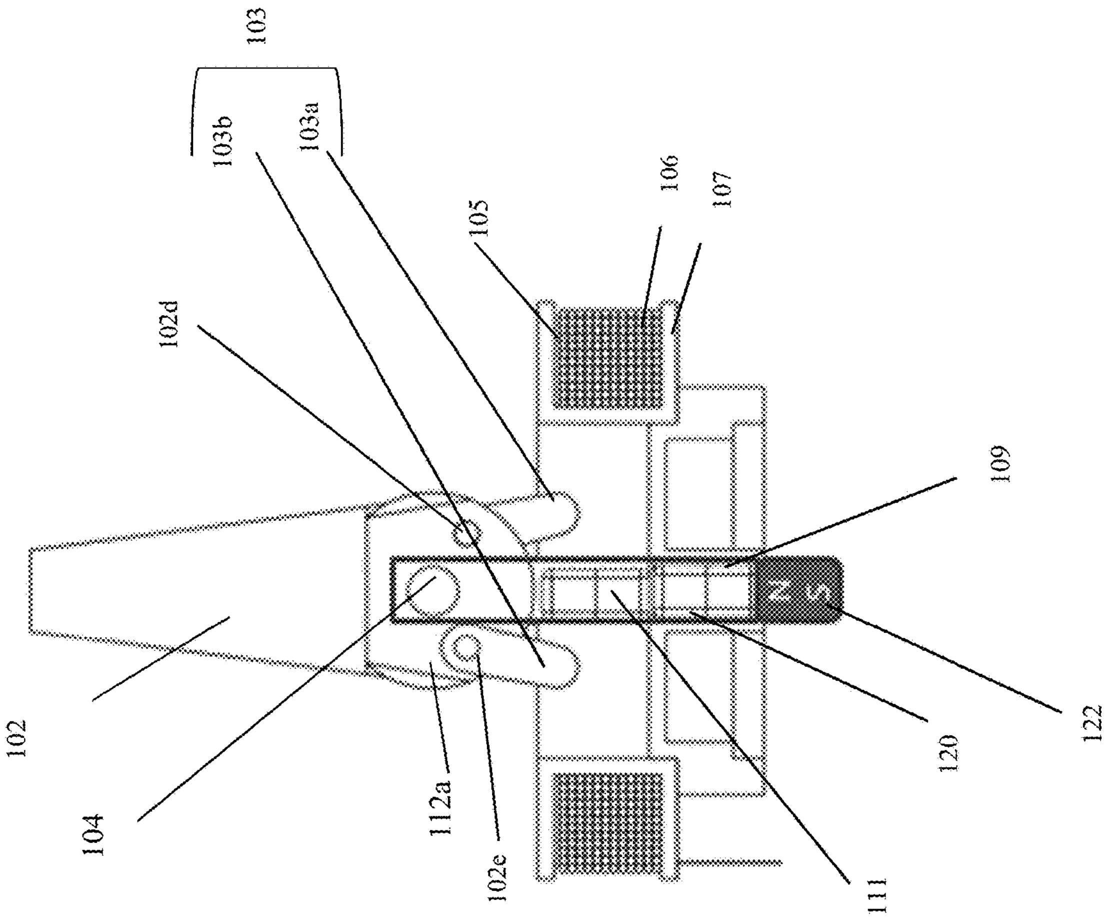
FIG. 4Q provides a section view of an energy harvesting generator in accordance with some embodiments of the present disclosure.

In some embodiments, the movement of the actuation lever 102 in the sequence illustrated in FIGS. 4A-4O may be mediated by a spring or magnetic return element. For example, in some embodiments, the actuation lever 102 is coupled to a spring (not shown) that is biased to return the actuation lever 102 to the neutral configuration illustrated in FIGS. 4A, 4G, 4H, and 4O. Alternatively, as illustrated in FIGS. 4P and 4Q, the actuation lever 102 may be coupled to a magnetic return. As depicted in FIGS. 4P and 4Q, the actuation lever 102 may be coupled to an element 120 with a first end that engages with the actuation lever about 104. The second end of the element may be coupled to a magnetic return element 122. The magnetic return element 122 may undergo an attractive force to the stationary magnet 109 such that the actuation lever 102 is encouraged to return to the neutral configuration. In some embodiments, the magnetic return element 122 may be oriented with a North-South orientation.

FIGS. 5A-5H provide various perspective views of an energy harvesting generator having a central stacked magnet configuration, such as energy harvesting generator 100.

Figure 5B:
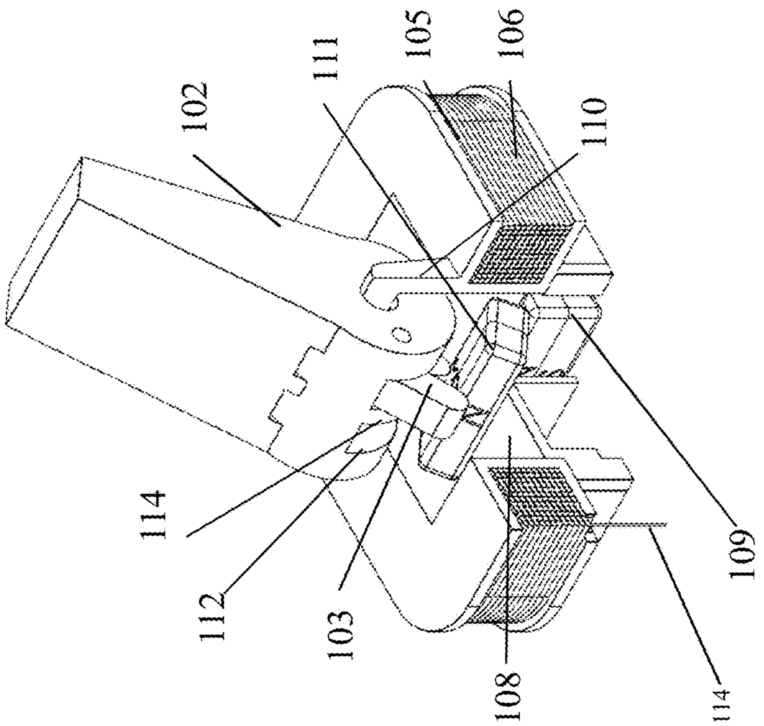
FIG. 5B provides a cross-sectional view of FIG. 5A in accordance with some embodiments of the present disclosure.
Figure 5A:
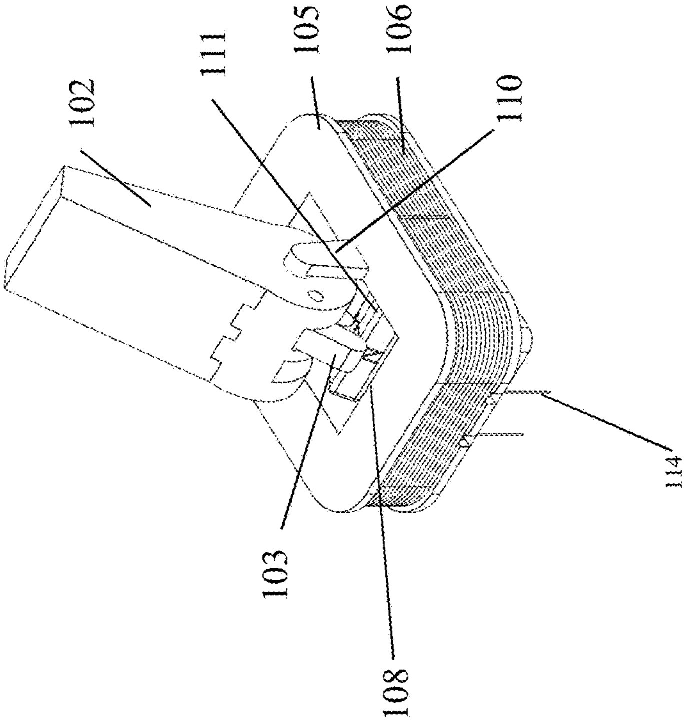
FIG. 5A provides a first perspective view of an energy harvesting generator in accordance with some embodiments of the present disclosure.

More particularly, FIG. 5A provides a first top perspective view of the actuation lever 102 with the drive lobes 103 that make contact with the generator magnet 111 positioned within the central area 108. As illustrated, the drive lobes 103 may actuate the generator magnet 111 from a first position to a second position. Also shown is the recess 106 that may hold a coil. FIG. 5B provides a cross-sectional view of FIG. 5A, where a segment of the casing is removed. As shown in FIG. 5B, the generator magnet 111 may be deflected from a position above the stationary magnet 109. Additionally, as illustrated in FIGS. 5A-5F, the actuation lever 102 may also have a hole 104 though which a pin 110 may be inserted such that the actuation lever 102 is configured to rotate about the pin in both the clockwise and counterclockwise directions (e.g., directions A and C discussed in FIGS. 4A-4O).

Figure 5D:
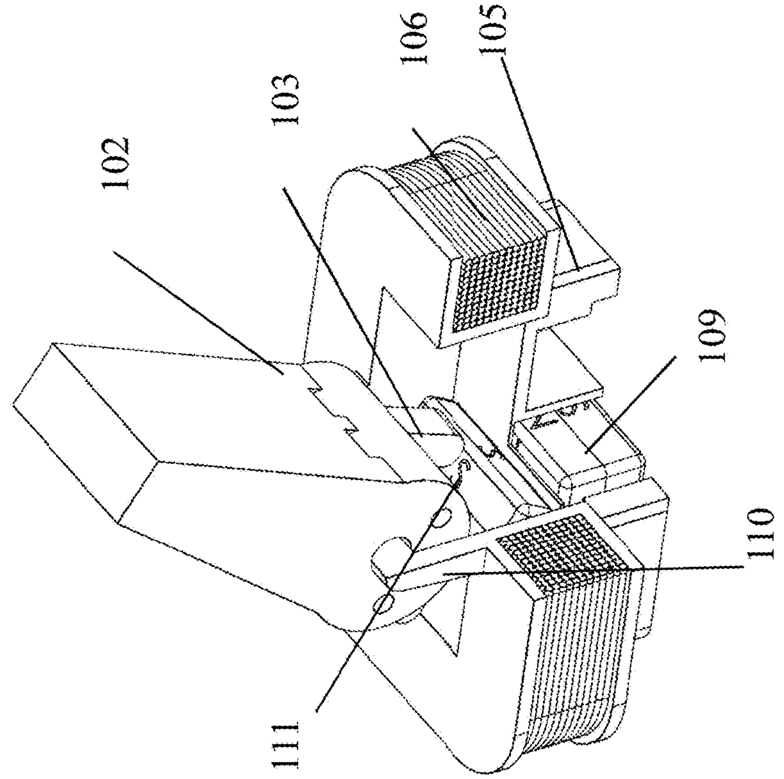
FIG. 5D provides a cross-sectional view of FIG. 5C in accordance with some embodiments of the present disclosure.
Figure 5C:
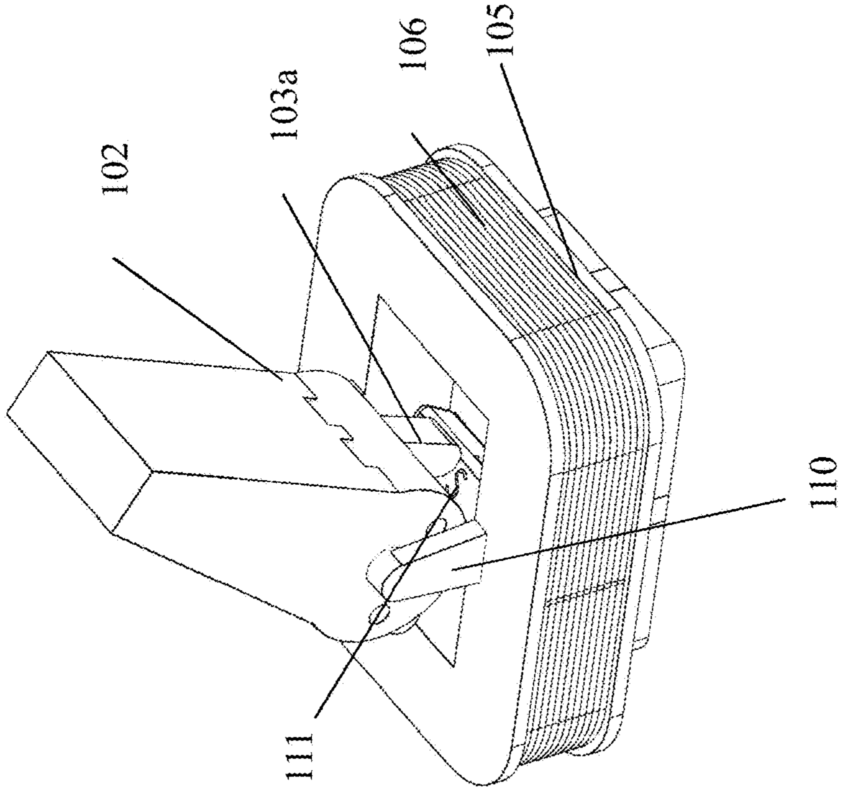
FIG. 5C provides a second perspective view of the energy harvesting generator of FIG. 5A in accordance with some embodiments of the present disclosure.

FIG. 5C provides a second perspective view of an actuation lever 102 with drive lobes 103 that make contact with the generator magnet 111. As illustrated, as the drive lobe 103 makes contact with the generator magnet 111, the generator magnet 111 continues to separate from and pivot with respect to the stationary magnet 109. FIG. 5D provides a cross-sectional view of FIG. 5C, where a segment of the casing is removed. As shown in FIG. 5D, the generator magnet 111 may be deflected from a position above the stationary magnet 109.

Figure 5E:
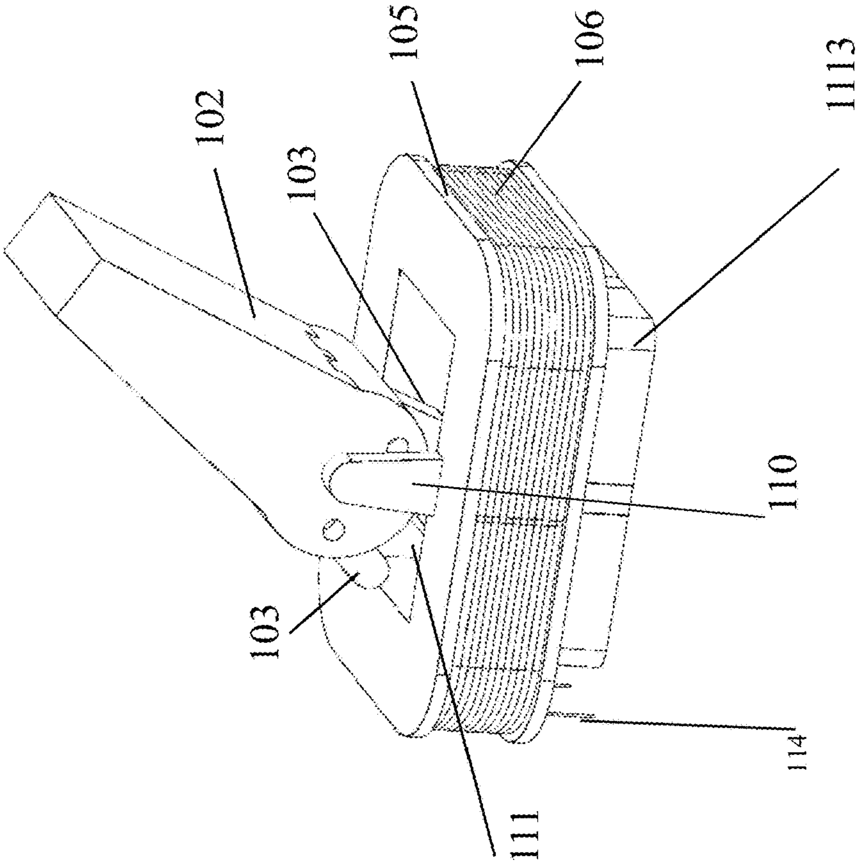
FIG. 5E provides a third perspective view of the energy harvesting generator of FIG. 5A in accordance with some embodiments of the present disclosure.
Figure 5F:
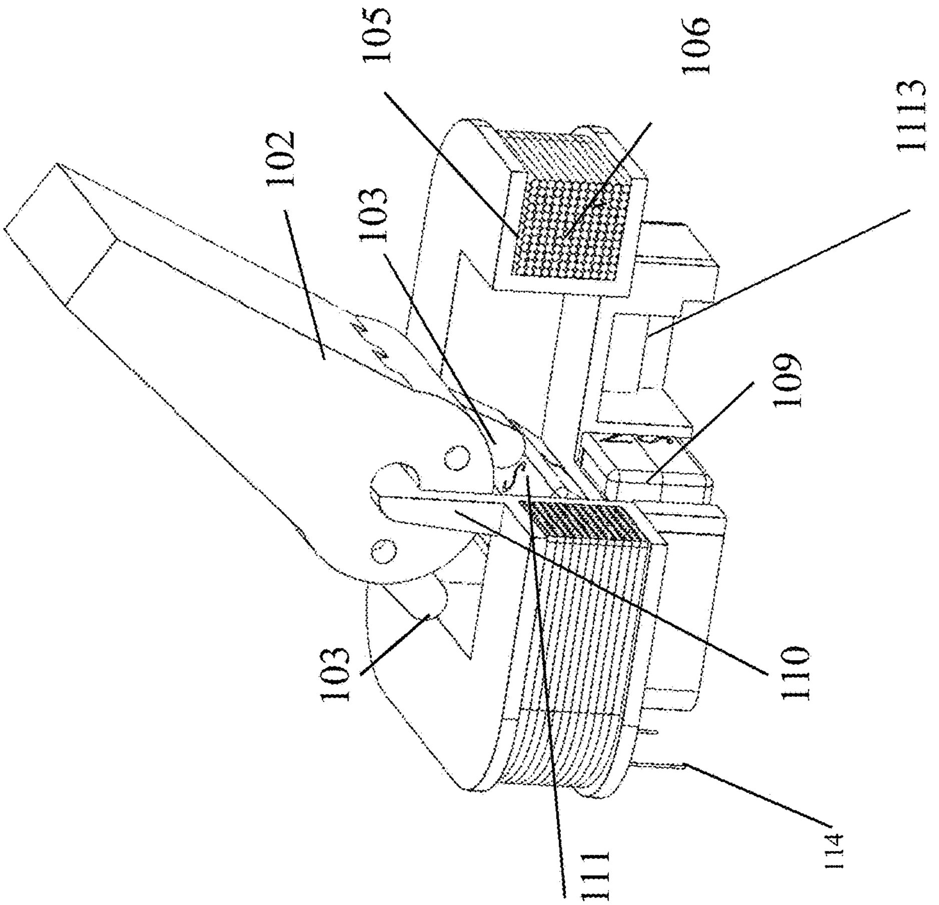
FIG. 5F provides a cross-sectional view of FIG. 5E in accordance with some embodiments of the present disclosure.

FIG. 5E provides a third perspective view. FIG. 5F provides a cross-sectional view of FIG. 5E, where a segment of the casing is removed. As shown in FIG. 5F, the generator magnet 111 may be deflected from a position above the stationary magnet 109.

Figure 5H:
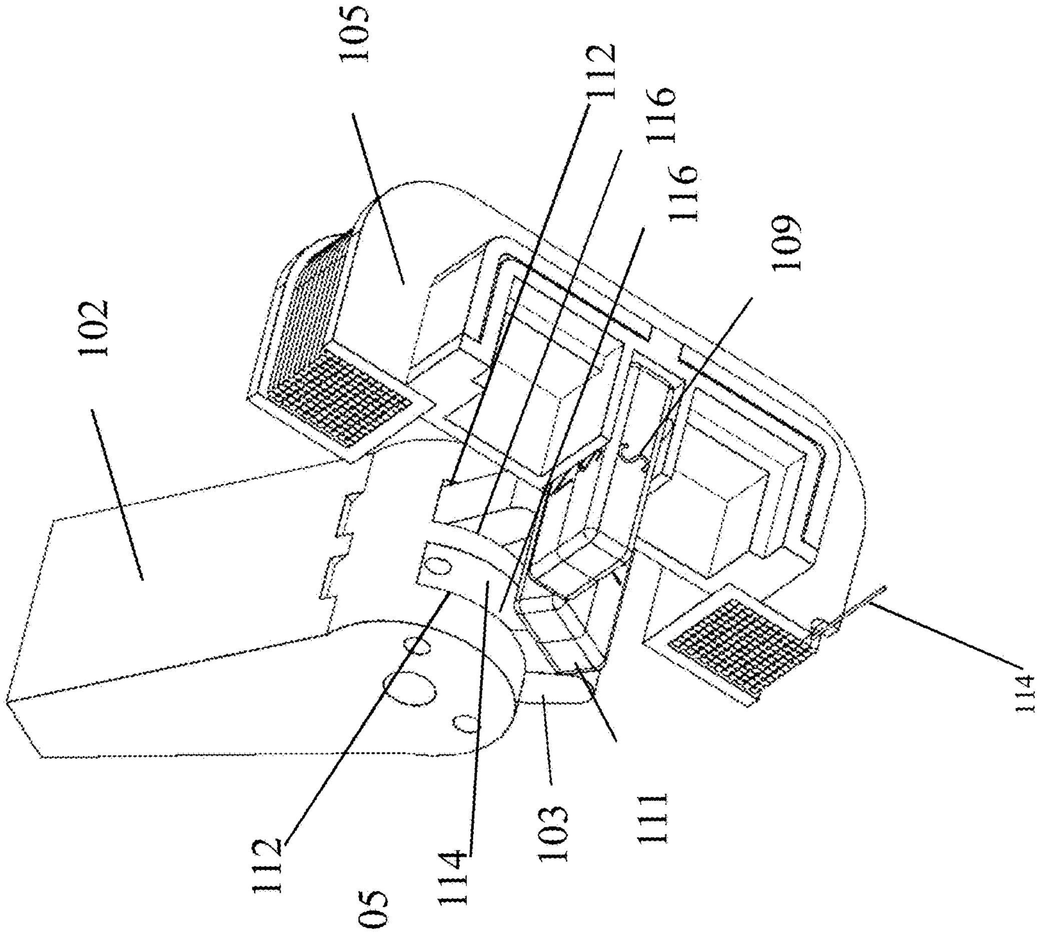
FIG. 5H provides a cross-sectional view of FIG. 5G in accordance with some embodiments of the present disclosure.
Figure 5G:
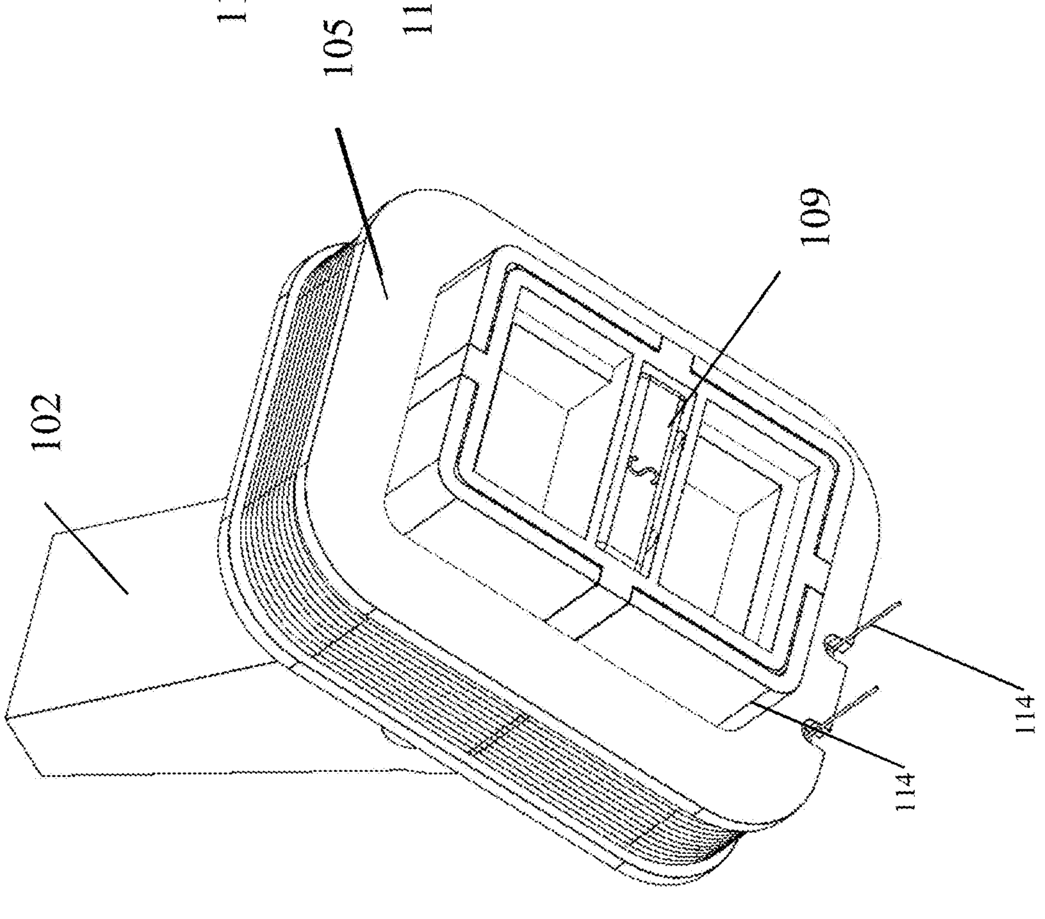
FIG. 5G provides a fourth perspective view of the energy harvesting generator of FIG. 5A in accordance with some embodiments of the present disclosure.

FIG. 5G provides a fourth perspective view, from the bottom of an energy harvesting generator 100, showing that a stationary magnet 109 may be positioned in the center of the mechanism. The casing composed of plastic may be used to hold the stationary magnet 109 in place. FIG. 5H provides a cross-sectional view of FIG. 5G, where a segment of the casing is removed. As shown in FIG. 5H, the generator magnet 111 may be deflected from a position above the stationary magnet 109.

Further, FIGS. 5A-5H provide a perspective view of the two recesses 116 positioned along the 102*b*. Each recess has a retaining wall 112 within which a drive lobe 103 may be positioned. As discussed with respect to the rotation illustrated in FIGS. 4A-4O, the rotation of the drive lobes 103 with respect to the actuation lever 102 about points 102*d*, 102*e*, respectively, can be mediated by the retaining walls, such as retaining wall 112.

Figure 6A:
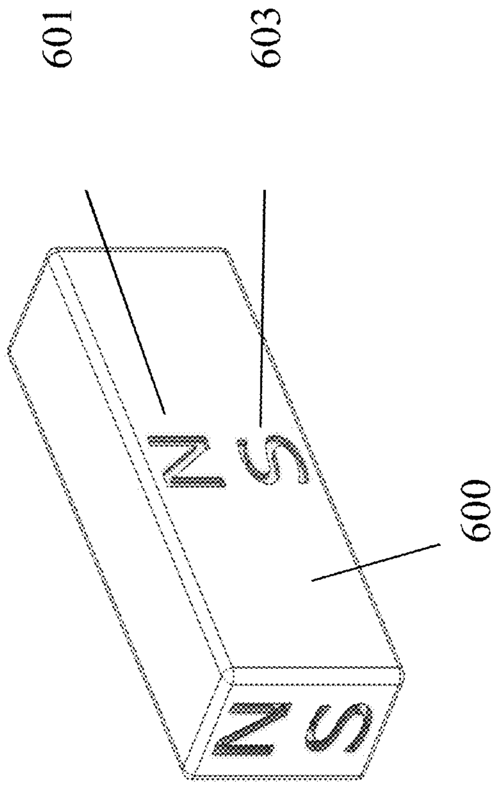
FIG. 6A provides a perspective view of a generator magnet for an energy harvesting generator in accordance with some embodiments of the present disclosure.
Figure 6B:
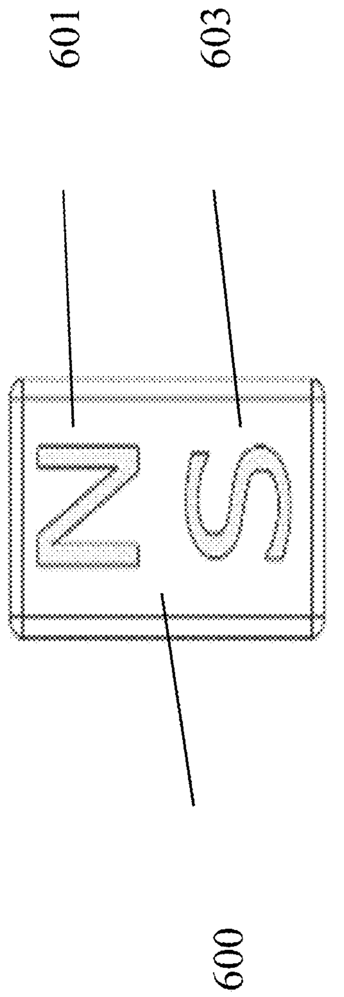
FIG. 6B provides a side view of the generator magnet of FIG. 6A in accordance with some embodiments of the present disclosure.

FIG. 6A provides a perspective view of an exemplary generator magnet for an energy harvesting generator in accordance with some embodiments of the present disclosure. As shown, the generator magnet 600, which may be the same or substantially the same as the generator magnet 111, may be a rectangular magnet with the illustrated magnetization direction, such that a North magnetic pole 601 is positioned on top of a South magnetic pole 603. FIG. 6B provides a side, end view of the generator magnet 600 of FIG. 6A. Although a rectangular generator magnet is illustrated, it is envisioned that the generator magnet may have alternative shapes and features.

Figure 6C:
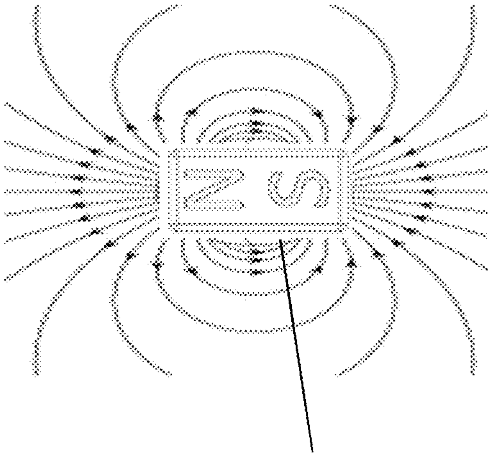
FIG. 6C provides an illustration of a magnetic field for the generator magnet of FIG. 6A in accordance with some embodiments of the present disclosure.

FIG. 6C provides a first illustration of a magnetic field generated by the generator magnet 600. As illustrated in FIG. 6C, increases in magnetic field lines per unit area or flux lines or flux are associated with an increase in the amount of induced voltage in a coil-wire form.

Figure 7A:
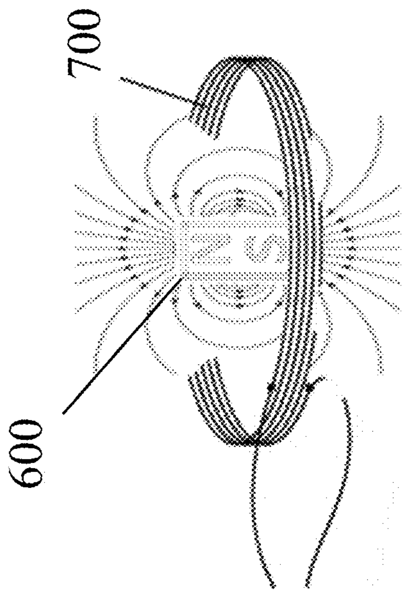
FIG. 7A depicts a magnetic field in connection with an energy harvesting generator in accordance with some embodiments of the present disclosure.
Figure 7B:
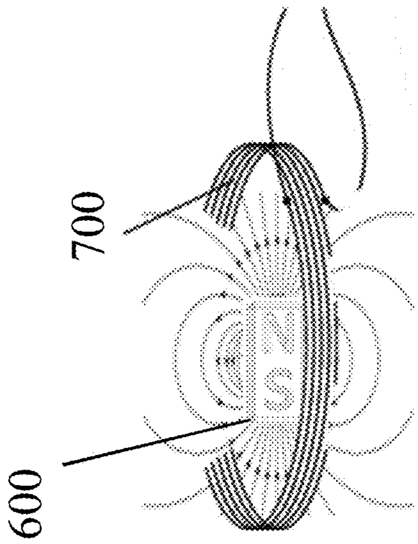
FIG. 7B depicts a magnetic field in connection with an energy harvesting generator in accordance with some embodiments of the present disclosure.

FIGS. 7A and 7B provide an exemplary illustration of a magnetic field generated by the generator magnet 600 when positioned within a coil 700. In FIG. 7A, the generator magnet 600 is positioned in a vertical orientation, and so the magnetic flux vector dominates in the vertical direction. And, as illustrated in FIG. 7B, the dominant flux vector field is in the horizontal direction given that the generator magnet is positioned in a horizontal orientation. In accordance with Faraday's Law, the energy or voltage that is produced by an induction coil 700 is proportional to the time rate change of the net flux crossing through the interior area of the induction coil 700. As illustrated in FIG. 7A, when the magnet 600 is in a substantially vertical orientation, there is a relatively large amount of flux (represented by the arrows provided in FIG. 7A) passing through normal to the plane of the coil 700. However, as illustrated in FIG. 7B, when the magnet 600 is in a substantially horizontal orientation, there is a relatively lesser amount of flux (represented by the arrows provided in FIG. 7B) passing through normal to the interior of the coil 700. This is due to the field (represented by the arrows provided in FIGS. 7A and 7B) being parallel to the induction coil 700.

Accordingly, rotation or pivoting of a magnet with sufficient velocity, such as magnet 600 or generator magnet 111, from a vertical orientation to a horizontal orientation or from a horizontal orientation to a vertical orientation would cause a time-rate change in the flux with respect to what the coil cross-section is exposed to, resulting in induced voltage at the terminal ends of a coil, such as coil 700 or the coil discussed above with respect to the generator 100. However, if the change in orientation were to happen slowly, the resulting rate of change in the flux would also be slow and not amount to a significant detectable voltage at the terminal ends of the coil. Accordingly, rotation of the magnet between a vertical orientation to a horizontal orientation or from a horizontal orientation to a vertical orientation at an extremely rapid rate may result in a high timerate change of flux, and produce a considerable output voltage in the output coil. Energy harvesting generators such as those described herein may utilize the rapid rotation of a generator magnet from a substantially vertical orientation to a horizontal orientation and vice versa so as to induce an appreciable output voltage in an induction coil positioned around the generator magnet.

Figure 8A:
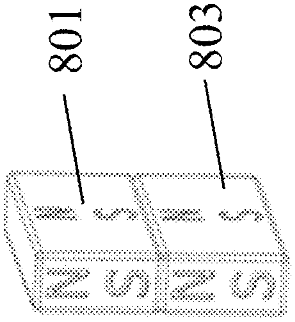
FIG. 8A depicts a generator magnet and a stationary magnet in a first configuration in connection with an energy harvesting generator in accordance with some embodiments of the present disclosure.
Figure 8B:
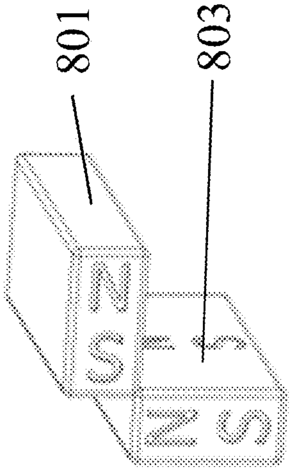
FIG. 8B depicts a generator magnet and a stationary magnet in a second configuration in connection with an energy harvesting generator in accordance with some embodiments of the present disclosure.

FIGS. 8A and 8B provide an illustration for a stacked central magnet configuration in accordance with some embodiments of the present disclosure. As illustrated in FIGS. 8A and 8B, a stacked configuration may include a generator magnet 801 positioned on top of a stationary or fixed magnet 803. The stationary magnet 803 may drive a restoring force configured to restore the generator magnet 801 back to its original position illustrated in FIG. 8A from the second position illustrated in FIG. 8B. In some embodiments, the generator magnet 801 may be actuated by one or more components into the second position illustrated in FIG. 8B. For example, the generator magnet 801 may be pushed by spring-loaded drive lobes and the like, such as the spring-loaded drive lobes 103 discussed above. As illustrated in FIG. 8B, when the generator magnet 801 is rotated 90 degrees from the vertical orientation, the generator magnet 801 may be subject to a large restoring torque that will angularly accelerate the generator magnet 801 when it is released as it pivots toward the equilibrium vertical rest position. When the generator magnet 801 is released from the substantially horizontal orientation illustrated in FIG. 8B, the generator magnet 801 may "spring back" or return to the vertical orientation of FIG. 8A. In some embodiments, a flexure, hinge, or isolation pad may be used in between the interface of the generator magnet 801 and the stationary magnet 803 to prevent chipping from impact forces when released. As illustrated, in some embodiments the generator magnet 801 and the stationary magnet 803 may be configured to have pole orientation in the up and down position. For example, the generator magnet 801 may be configured to have a North-South magnetic pole position and oriented on top of a stationary magnet 803 also having a North-South magnetic pole position. In some embodiments, the polarity of poles shown can be reversed.

When the stacked configuration illustrated in FIGS. 8A and 8B is placed in the center of an induction coil, the magnetic flux direction is substantially vertical into the cross-section of the induction coil when the generator magnet is in the vertical orientation depicted in FIG. 8A. Additionally, the magnetic flux direction is substantially horizontal to the induction coil when the generator magnetic is rotated 90 degrees to the horizontal orientation depicted in FIG. 8B. Accordingly, the change in the magnitude of the magnetic flux and the acceleration of the generator magnet from the horizontal position of FIG. 8B to the vertical position of FIG. 8A provides a time-rate change of magnetic flux within a short amount of time, thus resulting in the generation of significant voltage within the induction coil.

Figure 9A:
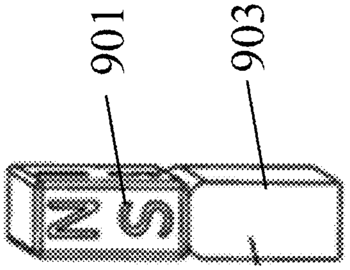
FIG. 9A depicts a generator magnet and a ferrous steel return block in a first configuration in connection with an energy harvesting generator in accordance with some embodiments of the present disclosure.
Figure 9B:
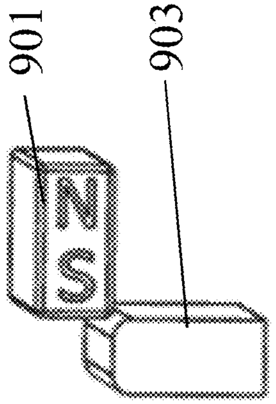
FIG. 9B depicts a generator magnet and a ferrous steel return block in a second configuration in connection with an energy harvesting generator in accordance with some embodiments of the present disclosure.

FIGS. 9A and 9B provide an alternative to the stacked central magnet configuration illustrated in FIGS. 8A and 8B. In particular, FIGS. 9A and 9B include a mechanism formed by a generator magnet and a ferrous steel return block in place of a stationary magnet. Accordingly, a generator magnet 901 may be placed upon a ferrous steel return block 903. Similar to the mechanism described above, rotation of the generator magnet from the near 90 degree horizontal orientation illustrated in FIG. 9B to the vertical orientation of FIG. 9A may result in a change in the magnitude of the magnetic flux therefore resulting in electromagnetic induction in the coil. In some embodiment, the use of a ferrous steel return block 903 instead of a stationary magnet may provide manufacturing cost savings. However, in some embodiments, the use of a ferrous steel return block 903 instead of a stationary magnet may result in the use of less restoring force and a reduction of the overall field strength. Accordingly, an energy harvesting mechanism utilizing a configuration such as that illustrated in FIGS. 9A and 9B may produce less energy in comparison to one utilizing the configuration illustrated in FIGS. 8A and 8B.

Figure 10A:
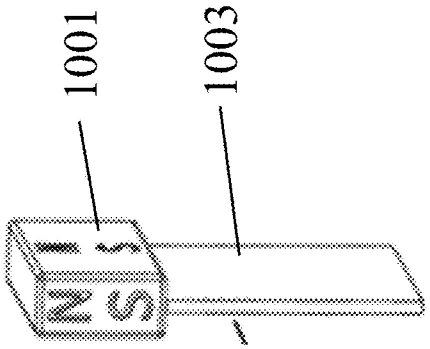
FIG. 10A depicts a generator magnet and a spring flexure return in a first configuration in connection with an energy harvesting generator in accordance with some embodiments of the present disclosure.
Figure 10B:
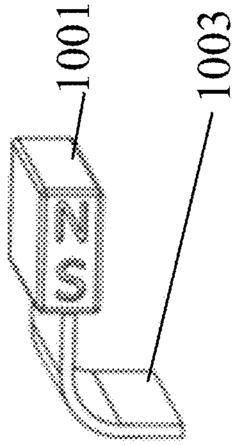
FIG. 10B depicts a generator magnet and a spring flexure return in a second configuration in connection with an energy harvesting generator in accordance with some embodiments of the present disclosure.

FIGS. 10A and 10B provide an illustration of a third configuration for a generator magnet. A generator magnet 1001 is coupled to a spring flexure 1003. The generator magnet 1001 can be actuated from the vertical orientation illustrated in FIG. 10A to the horizontal orientation illustrated in FIG. 10B. When the actuation force is released, the spring flexure may cause the generator magnet to accelerate from the horizontal orientation of FIG. 10B to the vertical orientation of FIG. 10A. Rotation of the generator magnet from the 90 degree horizontal orientation illustrated in FIG. 10B to the vertical orientation of FIG. 10A may result in a change in the magnitude of the magnetic flux, therefore resulting in the generation of voltage within the induction coil.

In another alternative embodiment, the generator magnet can be mounted upon a wind-up spring or similar mechanism, configured to return the actuated generator magnet from an off-vertical orientation to a vertical orientation.

Embodiments of an energy harvesting generator such as those described herein may be incorporated into many industrial and/or commercial applications. For example, in some embodiments, an energy harvesting generator may be incorporated into the automotive industry. For example, the disclosed energy harvesting generator may be incorporated into an automotive door switch. More particularly, in some embodiments the energy harvesting generator may replace one or more mechanical switches in the doors of an automobile including, for example, window actuators, door locks, mirror controls, and the like. In this manner, the disclosed energy harvesting generator may be used to eliminate or reduce the wiring requirements within an automotive, in turn providing improvements in automotive service and reliability and reducing integration costs. Alternative industrial applications are envisioned.

One skilled in the art will appreciate further features and advantages of the invention based on the above-described embodiments. Accordingly, the invention is not be limited by what has been particularly shown and described, except as indicated by the appended claims.

I claim:

1. An electrical generator comprising:

a plurality of turns of wire forming a coil;

a generator magnet positioned in an interior region of the coil;

a stationary magnet positioned below the generator magnet, wherein the generator magnet is aligned with the stationary magnet along a longitudinal axis that is orthogonal to a plane along which the coil is disposed when the generator magnet is in a first position;

an actuator movable relative to the generator magnet, the actuator configured such that the actuator moves the generator magnet to pivot from the first position to a second position in which the poles of the generator magnet are in a second position relative to the plane, wherein the generator magnet returns to the first position upon release of the actuator at least in part due to a restoring force applied to the generator magnet by the stationary magnet, and wherein movement of the generator magnet from the second position to the first position induces a voltage across the coil.

2. The electrical generator of claim 1, wherein at least a part of the voltage induced across the coil is due to the movement of the generator magnet responsive to the restoring force.

3. The electrical generator of claim 2, further comprising:

at least one of a flexure, hinge, or isolation pad positioned at an interface of the generator magnet and the stationary magnet.

4. The electrical generator of claim 1, wherein the actuator further comprises:

a first spring-loaded drive lobe configured to move the generator magnet.

5. The electrical generator of claim 4, wherein the actuator further comprises:

a second spring-loaded drive lobe configured to move the generator magnet.

6. The electrical generator of claim 5, wherein the actuator further comprises:

at least one retaining wall on a terminal end of the actuator, wherein the at least one retaining wall is configured to position at least one of the first spring-loaded drive lobe or the second spring-loaded drive lobe.

7. The electrical generator of claim 1, further comprising:

a casing having a bobbin configured to hold the coil.

8. The electrical generator of claim 1, further comprising:

a casing having at least one compartment configured to hold the generator magnet.

9. A method for energy generation comprising:

positioning a generator magnet within a coil formed from a plurality of turns of wire;

positioning a stationary magnet below the generator magnet, wherein the generator magnet is aligned with the stationary magnet along a longitudinal axis that is orthogonal to a plane along which the coil is disposed when the generator magnet is in a first position;

actuating the generator magnet to pivot from the first position relative to the plane along which the coil is disposed to a second position in which the poles of the generator magnet are in a second position relative to the plane; and inducing a voltage across the coil by releasing the actuation of the generator magnet such that the generator magnet pivots from the second position to the first position at least in part due to a restoring force applied to the generator magnet by the stationary magnet.

10. The method of claim 9, further comprising:

applying, by the stationary magnet positioned below the generator magnet, the restoring force to the generator magnet to return the generator magnet to the first position from the second position.

11. An electrical generator comprising:

a plurality of turns of wire forming a coil;

a generator magnet positioned in the coil;

a stationary magnet positioned below the generator magnet, wherein the generator magnet is aligned with the stationary magnet along a longitudinal axis that is orthogonal to a plane along which the coil is disposed when the generator magnet is in a first position; and an actuator movable relative to the generator magnet, the actuator configured such that the actuator moves the generator magnet from the first position relative to the plane along which the coil is disposed to a second position in which the poles of the generator magnet are in the second position relative to the plane, such that the generator magnet pivots from the first position to the second position, wherein the generator magnet returns to the first position from the second position upon release of the actuator at least due in part to a restoring force applied to the generator magnet by the stationary magnet, and wherein movement of the generator magnet from the second position to the first position, induces a voltage across the coil output terminals or within the coil.

12. The electrical generator of claim 11, further comprising:

at least one of a flexure, hinge, or isolation pad positioned at an interface of the generator magnet and the stationary magnet.

13. The electrical generator of claim 11, wherein the actuator further comprises:

a first spring-loaded drive lobe configured to move the generator magnet.

14. The electrical generator of claim 13, wherein the actuator further comprises:

a second spring-loaded drive lobe configured to move the generator magnet.

15. The electrical generator of claim 14, wherein the actuator further comprises:

at least one retaining wall on a terminal end of the actuator, wherein the at least one retaining wall is configured to position at least one of the first spring-loaded drive lobe or the second spring-loaded drive lobe.

16. The electrical generator of claim 11, further comprising:

a casing having a bobbin configured to hold the coil.

17. The electrical generator of claim 11, further comprising:

a casing having at least one compartment configured to hold the generator magnet.

18. The electrical generator of claim 11, further comprising:

a casing having at least one compartment configured to hold the stationary magnet.

* * * * *